United States Patent
Wofk et al.

(10) Patent No.: US 12,400,346 B2
(45) Date of Patent: Aug. 26, 2025

(54) METHODS AND APPARATUS FOR METRIC DEPTH ESTIMATION USING A MONOCULAR VISUAL-INERTIAL SYSTEM

(71) Applicant: Intel Corporation, Santa Clara, CA (US)

(72) Inventors: Diana Wofk, Santa Clara, CA (US); Rene Ranftl, Munich (DE); Matthias Mueller, Munich (DE); Vladlen Koltun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 17/855,330

(22) Filed: Jun. 30, 2022

(65) Prior Publication Data

US 2022/0343521 A1   Oct. 27, 2022

Related U.S. Application Data

(60) Provisional application No. 63/314,121, filed on Feb. 25, 2022.

(51) Int. Cl.
*G06T 7/50* (2017.01)
(52) U.S. Cl.
CPC ...... *G06T 7/50* (2017.01); *G06T 2207/20081* (2013.01); *G06T 2207/20084* (2013.01)
(58) Field of Classification Search
CPC ............. G06T 7/50; G06T 2207/20084; G06T 2207/20081; G06T 2207/10024; G06T 2207/10016
See application file for complete search history.

(56) References Cited

U.S. PATENT DOCUMENTS

| | | | | |
|---|---|---|---|---|
| 11,232,583 | B2* | 1/2022 | Narasimha | G06T 7/73 |
| 2021/0142497 | A1* | 5/2021 | Pugh | G06T 7/194 |

OTHER PUBLICATIONS

Engel, J. et al., "Lsd-slam: Large-scale direct monocular slam", In ECCV, 2014, 16 pages. Retrieved from <https://jakobengel.github.io/pdf/engel14eccv.pdf> on Mar. 27, 2023.

Mur-Artal, R. et al., "Orb-slam: A versatile and accurate monocular slam system", IEEE Transactions on Robotics, 2015, 18 pages, Retrieved from <https://arxiv.org/abs/1502.00956> on Mar. 27, 2023.

(Continued)

*Primary Examiner* — Congvan Tran
(74) *Attorney, Agent, or Firm* — Hanley, Flight & Zimmerman, LLC

(57) ABSTRACT

Methods, apparatus, systems, and articles of manufacture are disclosed for metric depth estimation using a monocular visual-inertial system. An example apparatus for metric depth estimation includes at least one memory, instructions in the apparatus, and processor circuitry to execute the instructions to access a globally-aligned depth prediction, the globally-aligned depth prediction generated based on a monocular depth estimator, access a dense scale map scaffolding, the dense scale map scaffolding generated based on visual-inertial odometry, regress a dense scale residual map determined using the globally-aligned depth prediction and the dense scale map scaffolding, and apply the dense scale residual map to the globally-aligned depth prediction.

25 Claims, 28 Drawing Sheets

(56) References Cited

OTHER PUBLICATIONS

Mur-Artal, R. et al., "Orb-slam2: An open-source slam system for monocular, stereo, and rgb-d cameras", IEEE Transactions on Robotics, 2017, 9 pages. Retrieved from <https://arxiv.org/pdf/1610.06475.pdf > on Mar. 27, 2023.

Ranftl, R. et al., "Towards robust monocular depth estimation: Mixing datasets for zero-shot cross-dataset transfer", IEEE TPAMI, 2020, 14 pages. Retrieved from <https://arxiv.org/pdf/1907.01341.pdf > on Mar. 27, 2023.

Ranftl, R. et al., "Vision transformers for dense prediction", ArXiv, 2021, 15 pages. Retrieved from <https://arxiv.org/pdf/2103.13413.pdf > on Mar. 27, 2023.

Wong, A. et al., "Unsupervised depth completion from visual inertial odometry", IEEE Robotics and Automation Letters, 2020, 16 pages. Retrieved from <https://arxiv.org/pdf/1905.08616.pdf> on Mar. 27, 2023.

Wong, A. et al., "Unsupervised depth completion with calibrated back projection layers", In ICCV, 2021, 19 pages. Retrieved from <https://arxiv.org/pdf/2108.10531.pdf> on Mar. 27, 2023.

Fei, X. et al., "Geo-supervised visual depth prediction", IEEE Robotics and Automation Letters, 2019, 8 pages. Retrieved from <https://arxiv.org/pdf/1807.11130.pdf> on Mar. 27, 2023.

Almalioglu, Y. et al., "SelfVIO: Self-Supervised Deep Monocular Visual-Inertial Odometry and Depth estimation", ArXiv, 2019, 18 pages. Retrieved from <https://arxiv.org/pdf/1911.09968.pdf> on Mar. 27, 2023.

Patil, V. et al., "Don't Forget The Past: Recurrent Depth Estimation from Monocular Video", IEEE Robotics and Automation Letters, 2020, 8 pages. Retrieved from <https://arxiv.org/pdf/2001.02613.pdf> on Mar. 27, 2023.

Teed, Z. et al., "Deepv2d: Video to depth with differentiable structure from motion", In ICLR, 2020, 20 pages. Retrieved from <https://arxiv.org/pdf/1812.04605.pdf> on Mar. 27, 2023.

Liu, C. et al., "Neural RGB-D Sensing: Depth and Uncertainty from a Video Camera", CVPR, 2019, 13 pages. Retrieved from <https://arxiv.org/pdf/1901.02571.pdf> on Mar. 27, 2023.

Xie, J. et al., "Video Depth Estimation by Fusing Flow-to-Depth Proposals", IROS, 2020, 8 pages, Retrieved from <https://arxiv.org/pdf/1912.12874.pdf> on Mar. 27, 2023.

Sartipi, K. et al., "Deep Depth Estimation from Visual-Inertial SLAM", IROS, 2020, 9 pages. Retrieved from <https://arxiv.org/pdf/2008.00092.pdf> on Mar. 27, 2023.

Merrill, N. et al., "Robust Monocular Visual-Inertial Depth Completion for Embedded Systems", ICRA, 2021, 7 pages. Retrieved from <https://pgeneva.com/downloads/papers/Merrill2021ICRA.pdf> on Mar. 27, 2023.

Luo, X. et al., "Consistent Video Depth Estimation", ACM Transactions on Graphics, 2020, 13 pages. Retrieved from <https://arxiv.org/pdf/2004.15021.pdf> on Mar. 27, 2023.

Schönberger, J. et al., "Structure-from-Motion Revisited", In CVPR, 2016, 10 pages. Retrieved from <https://openaccess.thecvf.com/content_cvpr_2016/papers/Schonberger_Structure-From-Motion_Revisited_CVPR_2016_paper.pdf> on Mar. 27, 2023.

Kopf, J. et al. "Robust Consistent Video Depth Estimation", In CVPR, 2021, 11 pages. Retrieved from <https://arxiv.org/pdf/2012.05901.pdf> on Mar. 27, 2023.

Qin, T. et al., "VINS-Mono: A Robust and Versatile Monocular Visual-Inertial State Estimator", IEEE Transactions on Robotics, 2018, 17 pages. Retrieved from <https://arxiv.org/pdf/1708.03852.pdf> on Mar. 27, 2023.

Li, Z. et al., "Megadepth: Learning Single-View Depth Prediction from Internet Photos", In CVPR, 2018, 10 pages. Retrieved from <https://arxiv.org/pdf/1804.00607.pdf> on Mar. 27, 2023.

Shah, S. et al., "AirSim: High-Fidelity Visual and Physical Simulation for Autonomous Vehicles", In Field and Service Robotics, 2017, 14 pages. Retrieved from <https://arxiv.org/pdf/1705.05065.pdf> on Mar. 27, 2023.

Wang, W. et al., "TartanAir: A Dataset to Push the Limits of Visual SLAM", IROS, 2020, 8 pages. Retrieved from <https://arxiv.org/pdf/2003.14338.pdf> on Mar. 27, 2023.

Lusk, P. & Sudhakar, S., "Anticipated VINS-Mono", 2018, 4 pages. Retrieved from <https://github.com/plusk01/Anticipated-VINS-Mono> on Mar. 27, 2023.

Fei, X. & Soatto, S., "XIVO: X Inertial-aided Visual Odometry and Sparse Mapping", 2019, 4 pages. Retrieved from <https://github.com/ucla-vision/xivo> on Mar. 27, 2023.

Deng, J. et al., "Imagenet: A Large-Scale Hierarchical Image Database", In CVPR, 2009, 8 pages. Retrieved from <https://www.image-net.org/static_files/papers/imagenet_cvpr09.pdf> on Mar. 27, 2023.

Loshchilov, I. et al., "Decoupled Weight Decay Regularization", In ICLR, 2019, 19 pages. Retrieved from <https://arxiv.org/pdf/1711.05101.pdf> on Mar. 27, 2023.

* cited by examiner

1100

| METHOD | DEPTH MODEL | iMAE | iRMSE | iAbSREL |
|---|---|---|---|---|
| GA ONLY | DPT + HYBRID | 22.94 | 35.49 | 0.126 |
| GA + SML | | 16.11 | 29.48 | 0.093 |
| GA ONLY | MiDaS v2.0 | 58.11 | 79.34 | 0.299 |
| GA + SML | | 28.79 | 46.67 | 0.156 |

1150

| METHOD | TRAINING SET | MAE | RMSE | iMAE | iRMSE | iAbSREL |
|---|---|---|---|---|---|---|
| GA ONLY | | 165.33 | 243.11 | 75.74 | 106.37 | 0.103 |
| GA + SML | VOID | 97.03 | 167.82 | 46.62 | 74.67 | 0.063 |
| GA + SML | TA (ZERO-SHOT) | 98.49 | 175.04 | 45.55 | 74.28 | 0.062 |
| GA + SML | TA+VOID | 82.65 | 153.51 | 38.56 | 66.23 | 0.051 |

| METHOD | MAE | RMSE | iMAE | iRMSE |
|---|---|---|---|---|
| 150 SPARSE POINTS *(0.05% DENSITY)* | | | | |
| VOICED-P | 179.66 | 281.09 | 95.27 | 151.66 |
| VOICED-S | 174.04 | 253.14 | 87.39 | 126.30 |
| KBNET | 131.54 | 263.54 | 66.84 | 128.29 |
| GA+SML (DPT-L) | 92.44 | 163.97 | 43.95 | 71.04 |
| GA+SML (DPT-H) | 97.03 | 167.82 | 46.62 | 74.67 |
| GA+SML (MiDaS-s) | 113.27 | 193.38 | 53.86 | 84.82 |
| 500 SPARSE POINTS *(0.15% DENSITY)* | | | | |
| VOICED-P | 124.11 | 217.43 | 66.95 | 121.23 |
| VOICED-S | 118.01 | 195.32 | 59.29 | 101.72 |
| KBNET | 77.70 | 172.49 | 38.87 | 85.59 |
| GA+SML (DPT-L) | 80.33 | 143.77 | 37.75 | 61.53 |
| GA+SML (DPT-H) | 81.30 | 146.16 | 37.35 | 60.92 |
| GA+SML (MiDaS-s) | 94.81 | 164.36 | 43.19 | 69.25 |
| 1500 SPARSE POINTS *(0.5% DENSITY)* | | | | |
| VOICED-P | 85.05 | 169.79 | 48.92 | 104.02 |
| VOICED-S | 73.14 | 146.40 | 42.55 | 93.16 |
| KBNET | 39.80 | 95.86 | 21.16 | 49.72 |
| GA+SML (DPT-L) | 64.89 | 116.72 | 31.02 | 49.98 |
| GA+SML (DPT-H) | 69.03 | 123.62 | 31.91 | 51.44 |
| GA+SML (MiDaS-s) | 77.89 | 135.27 | 36.70 | 57.55 |

FIG. 12B

| METHOD | SPARSIFIER | DENSITY | AVG PPS | MAE | RMSE | iMAE | iRMSE | iAbsRel |
|---|---|---|---|---|---|---|---|---|
| EVALUATING OVER ALL 800 SAMPLES OF VOID TEST SET | | | | | | | | |
| VOICED-P | | | | 179.66 | 281.09 | 95.27 | 151.66 | -- |
| VOICED-S | XIVO | 150 | ~188 | 174.04 | 253.14 | 87.39 | 126.30 | -- |
| KBNET | | | | 131.54 | 263.54 | 66.84 | 128.29 | -- |
| GA ONLY | XIVO | 150 | ~188 | 165.33 | 243.11 | 75.74 | 106.37 | 0.103 |
| GA+SML | | | | 97.03 (-41%) | 167.82 (-31%) | 46.62 (-38%) | 74.67 (-30%) | 0.063 (-39%) |
| EXCLUDING FIRST-IN-SEQUENCE SAMPLES DUE TO LACK OF TRACKING IN INITIAL SAMPLE → | | | | | | | | |
| EVALUATING OVER 792/800 SAMPLES OF VOID TEST SET | | | | | | | | |
| GA ONLY | XIVO | 150 | ~188 | 164.98 | 242.38 | 75.91 | 106.65 | 0.103 |
| GA+SML | | | | 96.78 (-41%) | 167.35 (-31%) | 46.73 (-38%) | 74.87 (-30%) | 0.062 (-40%) |
| GA ONLY | VINS-MONO | ≤150 | ~104 | 167.11 | 248.68 | 76.64 | 108.18 | 0.104 |
| GA+SML | | | | 138.42 (-17%) | 223.08 (-10%) | 67.39 (-12%) | 98.96 (-9%) | 0.092 (-12%) |
| GA ONLY | VINS-MONO | ≤50 | ~44 | 180.29 | 264.95 | 81.94 | 114.72 | 0.111 |
| GA+SML | | | | 148.65 (-18%) | 236.71 (-11%) | 70.23 (-14%) | 103.93 (-9%) | 0.095 (-14%) |

FIG. 16

METHODS AND APPARATUS FOR METRIC DEPTH ESTIMATION USING A MONOCULAR VISUAL-INERTIAL SYSTEM

RELATED APPLICATIONS

This patent claims priority to U.S. Patent Application Ser. No. 63/314,121, filed on Feb. 25, 2022. U.S. Patent Application Ser. No. 63/314,121 is hereby incorporated herein by reference in its entirety.

FIELD OF THE DISCLOSURE

This disclosure relates generally to computing systems, and, more particularly, to methods and apparatus for metric depth estimation using a monocular visual-inertial system.

BACKGROUND

Depth perception is fundamental to visual navigation, where correctly estimating distances to objects in view is critical for proper motion planning and obstacle avoidance. Accurate depth estimation is likewise critical for scene reconstruction, environment mapping, virtual-reality, and object manipulation. To be practical, depth estimation should be robust to scene changes and generalize across environments.

BRIEF DESCRIPTION OF THE DRAWINGS

FIG. 11 illustrates example tabulated data associated with the evaluation of TartanAir and/or VOID samples in connection with FIG. 10.

FIG. 12B illustrates example tabulated data associated with the evaluation of VOID samples in connection with FIG. 12A.

FIG. 16 illustrates example tabulated data associated with performance of the visual-inertial depth estimation pipeline disclosed herein at low densities of sparse metric depth points.

Figure 1:
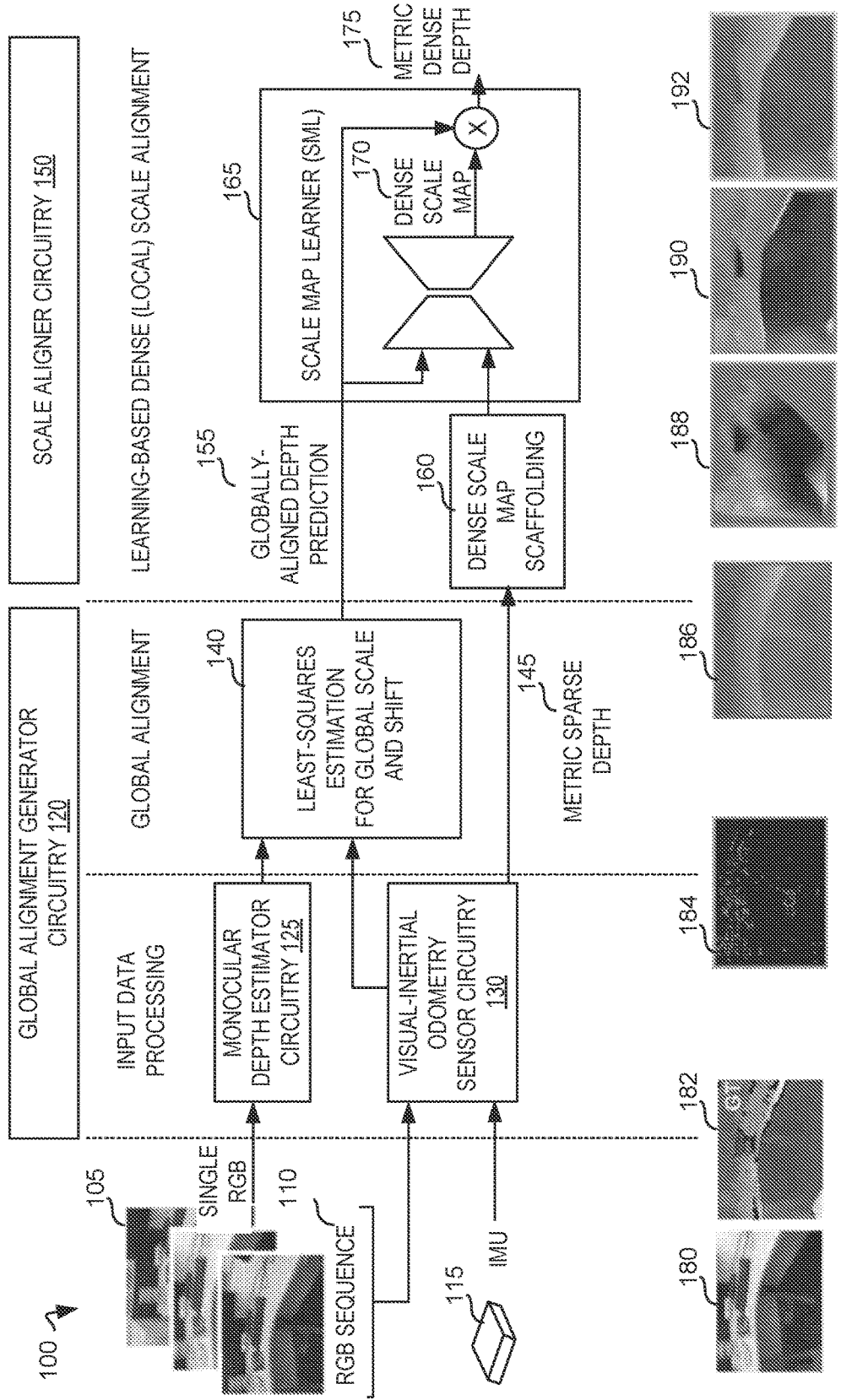
FIG. 1 illustrates an example visual-inertial depth estimation pipeline disclosed herein, including an input processing stage, a global scale and shift alignment stage, and a learning-based dense scale alignment stage associated with an example global alignment generator circuitry and an example scale aligner circuitry.

The figures are not to scale. In general, the same reference numbers will be used throughout the drawing(s) and accompanying written description to refer to the same or like parts. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Methods and apparatus for metric depth estimation using a monocular visual-inertial system are disclosed herein. As used herein, metric depth estimation refers to an extraction representing a spatial structure of a scene. For example, a depth measurement should be absolute and represent physical distance in a given unit. While examples disclosed herein refer to metric-based units, any other type of unit (e.g., imperial) can be used. Depth estimation can be used for inferring scene geometry from two-dimensional (2D) images. Monocular depth estimation can be used for predicting depth value(s) of each pixel in a 2D image and/or inferring depth information given only a single RGB (red, green, blue) image as input. Accurate estimation of depth scenes is vital for a wide range of computer vision tasks (e.g., computing semantic occupancy grids, detecting objects without labels, performing multi-modal unsupervised domain adaptation, etc.). For example, autonomous systems require a detailed spatial understanding of surroundings to carry out actions and/or initiate plans. Achieving both metric accuracy and high generalizability presents a challenge in learning-based monocular depth estimation. Furthermore, depth perception is fundamental to visual navigation, where correctly estimating distances to objects in view is critical for proper motion planning and/or obstacle avoidance.

While known solutions can generalize well across scenes (e.g., MiDaS, Dense Prediction Transformers (DPT), etc.), such methods produce affine-invariant depth with unknown metric scale. Resolving scale ambiguity and improving metric depth accuracy by realigning depth estimates from arbitrary monocular depth estimation models can improve depth estimation accuracy and efficiency. Known approaches to monocular depth estimation models include (1) incorporating inertial and pose information to improve metric depth accuracy (e.g., through planarity loss, pose consistency loss, and/or reprojection terms), (2) using sparse-to-dense depth, where sparse point clouds (e.g., from Light Detection and Ranging (LiDaR) or visual-inertial odometry) determine an input depth scaffolding for metric depth completion, and (3) exploiting temporal correlation in video frames to improve scale consistency of monocular depth estimates (e.g., without absolute metric scale).

For example, algorithms for dense depth estimation can be broadly grouped into several categories. Stereo-based methods rely on two or more cameras along a baseline that capture different view(s) from which accurate depth(s) can be determined. Structure-from-motion (SfM) methods estimate scene geometry from a sequence of images taken by a moving camera. However, recovering depth with absolute scale can be challenging since there is no baseline and/or camera viewpoint(s) may be unknown. In comparison, monocular-based methods require just one camera and attempt to estimate depth from a single image. Monocular-based methods are more appealing for mobile applications since simple RGB cameras are compact and ubiquitous. However, monocular approaches that rely solely on visual data still exhibit scale ambiguity. Incorporating inertial data can help resolve existing scale ambiguities, given that mobile devices already contain inertial measurement units (IMUs). Simultaneous localization and mapping (SLAM) likewise use visual and/or visual-inertial data to track scene landmarks under camera motion, compute the camera trajectory, and/or map the traversed environment. However, SLAM systems typically only track on the order of hundreds to thousands of sparse feature points, resulting in metric depth measurements that are only semi-dense at best.

Recent advances in supervised learning-based monocular depth estimation enable high generalizability at the cost of removing metric scale from consideration and only predicting relative depth. Methods using inertial data to inform metric scale typically perform depth completion given a set of known sparse metric depth points and tend to be self-supervised in nature due to a lack of visual-inertial datasets. To improve monocular depth estimation accuracy, network architectures and training dataset splits can be grown in complexity and size. In addition, multi-task subnetworks and multi-term loss functions can be utilized. However, such increasing complexity contributes to longer training and/or finetuning times and can necessitate high graphics processing unit (GPU) cluster usage. Methods that improve metric depth accuracy through additional loss terms or perform metric depth completion are trained using a limited corpus of data, which negatively impacts generalizability across scenes with varying depth ranges. Methods that enforce scale consistency in monocular video depth estimation do not necessarily enforce scale accuracy and so continue to suffer from scale ambiguity. However, a metric scale can be resolved through global and/or local alignment of affine-invariant depth estimates against a set of sparse metric depth points obtained through visual-inertial odometry. For example, global alignment can be performed within an inverse depth space based on a least-squares criterion, yielding global scale and shift factors that bring depth values to a correct order of magnitude. Likewise, local alignment can be formulated as a learning task where a lightweight encoder-decoder architecture is trained in a supervised manner to regress dense scale maps, which enables per-pixel scaling of globally aligned depth maps to produce an example output depth with an increased metric accuracy.

Methods and apparatus for metric depth estimation using a monocular visual-inertial system are disclosed herein. Methods and apparatus disclosed herein resolve scale ambiguity in monocular depth estimates, enabling both metric accuracy and generalizability for practical applications (e.g., for autonomous systems use, etc.). Methods and apparatus disclosed herein leverage robust monocular depth estimation models trained on mixed datasets and recover metric scale for individual depth estimates. In examples disclosed herein, inertial data can be used in conjunction with monocular visual data to produce fully-dense metrically accurate depth predictions. For example, methods and apparatus disclosed herein perform least-squares fitting of monocular depth estimates against metric sparse depth, followed by learned local per-pixel depth scaling. This combination of global and dense (local) depth alignment rectifies metric scale in depth estimates, with dense alignment consistently outperforming a global alignment baseline. In examples disclosed herein, alignment can be successfully achieved using just 150 sparse depth points. In the examples disclosed herein, a modular structure can be used to facilitate drag-and-drop of monocular depth estimation models and/or visual odometry systems, thereby reinforcing deployability and allowing for improvement over existing depth and/or visual odometry algorithms. Furthermore, methods and apparatus disclosed herein allow for reduced training times (e.g., up to 4 hours) with limited data (e.g., approximately 50-250 k samples) on a single node with 8 GPUs, while still exhibiting accurate metric depth error reduction and demonstrating robust zero-shot performance via synthetic-to-real cross-dataset evaluation. For example, methods and apparatus disclosed herein support simple swapping of monocular depth estimation and visual-inertial odometry subsystems to allow recent and future advances in monocular depth estimation and/or visual-inertial odometry to be directly leveraged for improved dense metric depth estimation. Furthermore, examples disclosed herein resolve metric scale for metrically ambiguous depth estimates, thereby making highly generalizable affine-invariant depth models more practical for integration into applications such as real-world sensor fusion, augmented reality and/or virtual reality (AR/VR), mapping, navigation systems, etc.

FIG. 1 illustrates an example visual-inertial depth estimation pipeline 100 disclosed herein, including an input processing stage, a global scale and shift alignment stage, and a learning-based dense scale alignment stage associated with an example global alignment generator circuitry 120 and an example scale aligner circuitry 150. In the example of FIG. 1, a single RGB image 105 derived from an RGB image sequence 110 (e.g., sequence of individual RBG images) can be provided to a monocular depth estimator circuitry 125 as part of the global alignment generator circuitry 120, as described in connection with FIG. 2. In parallel, the RBG image sequence 110 and corresponding synchronized inertial measurement unit (IMU) data 115 can be provided to an example visual-inertial odometry sensor circuitry 130 associated with the global alignment generator circuitry 120, as described in connection with FIG. 2. As such, input data processing can be performed by the monocular depth estimator circuitry 125 and/or the visual-inertial odometry sensor circuitry 130.

For example, the three stages of the depth estimation pipeline 100 include (1) input processing, where RGB and IMU data feed into monocular depth estimation (e.g., using the monocular depth estimator circuitry 125) alongside visual-inertial odometry (e.g., using the visual-inertial odometry sensor circuitry 130), (2) global scale and shift alignment, where monocular depth estimates (e.g., obtained using the monocular depth estimator circuitry 125) are fitted to sparse depth output (e.g., obtained from the visual-inertial odometry sensor circuitry 130) in a least-squares manner (e.g., using a least-squares estimation for global scale and shift 140), and (3) learning-based dense scale alignment, where an example globally-aligned depth prediction 155 is more locally realigned using an example dense scale map 170 (e.g., regressed by a ScaleMapLearner (SML) 165). In the example of FIG. 1, a row of image(s) 180, 182, 184, 186, 188, 190, 192 illustrates a Visual Odometry with Inertial and Depth (VOID) sample processed through the pipeline, including an input RGB image 180, a ground truth (GT) depth image 182, sparse depth location(s) image 184 from the visual-inertial odometry sensor circuitry 130, a globally aligned depth map image 186, a scale map scaffolding image 188, a dense scale map image 190 regressed by the Scale-MapLearner (SML) 165, and a final depth map output 192.

The monocular depth estimator circuitry 125 predicts depth from a monocular image. For example, the monocular depth estimator circuitry 125 can include a pretrained model that takes in a single RGB image (e.g., RGB image 105) and produces a dense depth map up to a specified scale. In some examples, an existing developed model can be introduced as part of the monocular depth algorithm (e.g., integrated into the depth estimation pipeline 100 disclosed herein). Monocular processing is appealing as it enables low-complexity architectures that do not incur prohibitively large computation costs. The monocular depth estimator circuitry 125 can be compatible with more traditional convolutional models as well as with emerging dense prediction architectures. In examples disclosed herein, a depth estimator can be selected (e.g., DPT-Hybrid, etc.), such as a transformer-based model trained on a large meta-dataset using scale- and shift-invariant losses. While existing depth estimator(s) achieve high generalizability, their output measures depth relations between pixels, and depth values do not carry any metric meaning. As such, the depth estimation pipeline 100 aims to recover metric scale for every pixel in the output depth map generated as part of the monocular depth estimator circuitry 125.

The visual-inertial odometry sensor circuitry 130 uses IMU data 115 together with visual data (e.g., RGB sequence 110) to determine metric scale. Given a sequence of RGB images 110 with synchronized IMU data 115, a camera trajectory can be determined to produce a set of 3D world coordinates of features tracked throughout the image sequence 110. In some examples, the visual-inertial odometry sensor circuitry 130 can include a real-time monocular visual-inertial state estimator (e.g., VINS-Mono, etc.). In a reasonably textured environment, tracked features per frame can be in the order of ten to a hundred features. By projecting the feature coordinates to the image space, the visual-inertial odometry sensor circuitry 130 generates a sequence of sparse maps containing metric depth values (e.g., sparse depth location(s) image 184). These sparse depth maps serve as inputs to later alignment tasks, propagating information about metric scale throughout the rest of the depth estimation pipeline 100.

The global scale and shift alignment phase of the depth estimation pipeline 100 can be performed using least-squares estimation for global scale and shift 140. For example, the global alignment generator circuitry 120 receives an output from the monocular depth estimator circuitry 125 representing unit-less affine-invariant inverse depth (e.g., output received from a robust monocular depth estimation model such as DPT-Hybrid, etc.). To reintroduce metric scale into depth, the global alignment generator circuitry 120 aligns monocular depth estimates to sparse metric depth obtained through the visual-inertial odometry sensor circuitry 130 output, as shown in the example of FIG. 1. In some examples, the global alignment can be performed in an inverse depth space based on a least-squares criterion, as described in connection with FIG. 2. For example, the least-squares estimation for global scale and shift 140 can result in a per-frame global scale and global shift, where applying global scale can be interpreted as bringing depth values to a correct order of magnitude, while applying global shift can undo potential bias and/or offset in the original prediction. As such, the resulting globally aligned depth estimates can be used as input (e.g., globally-aligned depth prediction 155) into the learning based dense (local) scale alignment phase of the depth estimation pipeline 100 (e.g., performed using the scale aligner circuitry 150).

The scale aligner circuitry 150 can be used to perform dense (local) scale alignment given that global alignment may not adequately resolve metric scale in all regions of a depth map. As such, a learning-based approach can be used for determining dense (per-pixel) scale factors that are applied to globally aligned depth estimates. In the example of FIG. 1, a ScaleMapLearner (SML) network 165 can be trained (e.g., using an open-source machine learning framework such as MiDaS-small, etc.) to realign individual values in an input depth map to improve metric accuracy. In some examples, the SML network 165 can receive an input of two concatenated data channels, such as the globally aligned depth prediction 155 and/or a scaffolding for a dense scale map (e.g., dense scale map scaffolding 160 based on a metric sparse depth 145 output by the visual-inertial odometry sensor circuitry 130), as described in more detail in connection with FIG. 2. As such, the SML network 165 regresses the dense scale residual map 170 (e.g., dense scale map image 190 regressed by the SML network 165) and a resulting scale map can be generated and applied to the input depth, yielding an example final metric dense depth output 175 (e.g., shown visually using the final depth map output 192).

In the example of FIG. 1, the depth estimation pipeline 100 permits for the decoupling of visual and inertial data. For example, the pipeline 100 runs monocular depth estimation (e.g., based on the monocular depth estimator circuitry 125) and visual inertial odometry (VIO) (e.g., based on the visual-inertial odometry sensor circuitry 130) in parallel and independently of each other. The intermediate outputs from the monocular depth estimation and/or the visual inertial odometry are then fused together (e.g., using global alignment as part of the least-squares estimation for global scale and shift 140) to generate inputs to the SML network 165 (e.g., as part of learning-based dense (local) scale alignment). As such, newly developed modules (e.g., resulting from advances in monocular depth and VIO algorithms) can be easily integrated within the pipeline 100, and the SML network 165 can be quickly retrained to benefit from the improved performance of those modules. In contrast, designing a single unified network that learns metric depth directly from a joint RGB-IMU input would present challenges associated with an insufficient corpus of RGB-depth (RGB-D) datasets containing IMU data to train such a network and allow the network to perform generalization. In examples disclosed herein, when training the SML network 165, decoupling RGB-to-depth and VIO at the input provides the SML network 165 with an intermediate data representation that simplifies what the network 165 needs to learn to perform metric depth alignment. In such a case, limited synthetic and/or real data are sufficient for improved metric depth estimation.

Figure 2:
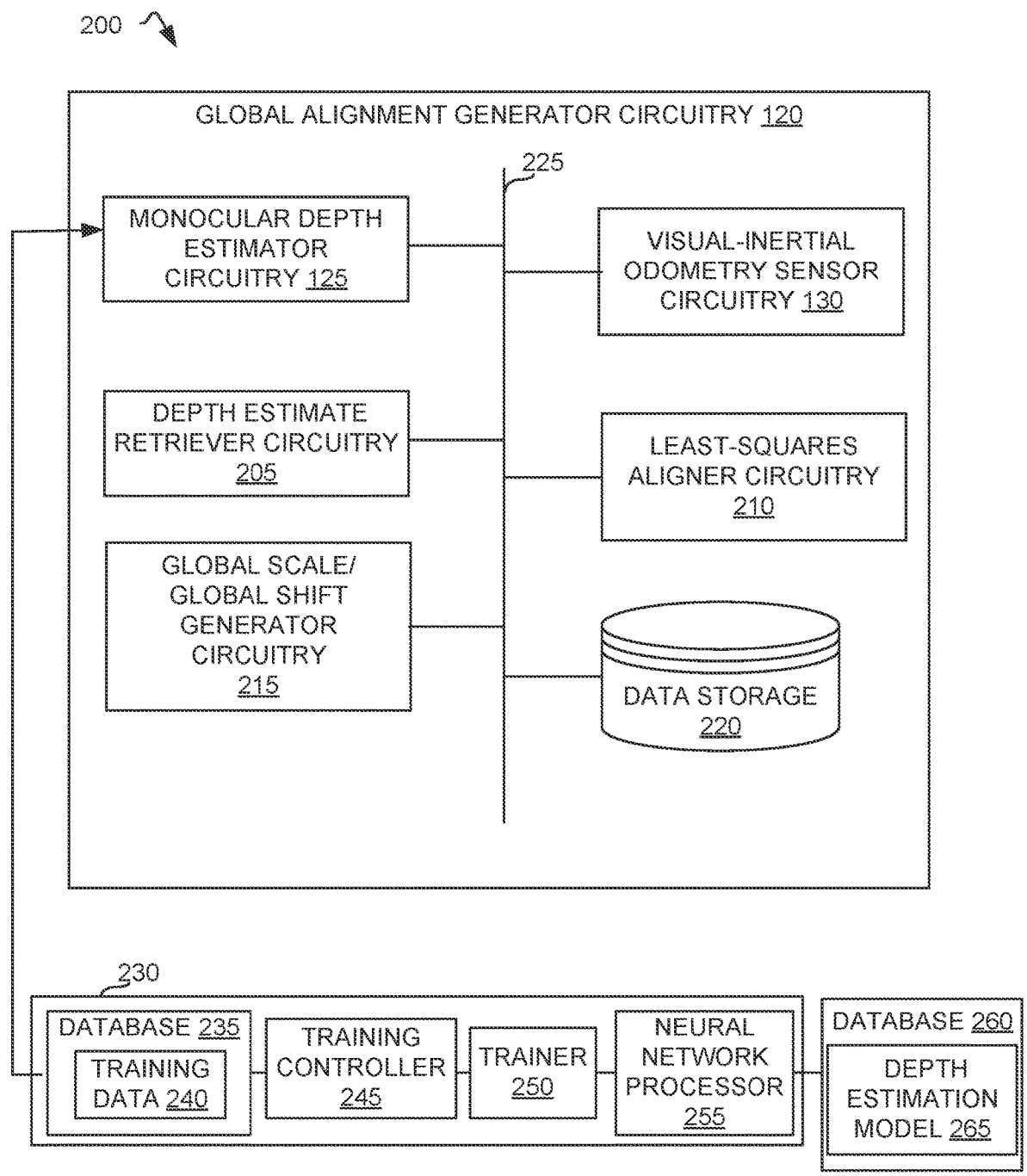
FIG. 2 is a block diagram of an example implementation of the global alignment generator circuitry of FIG. 1.

FIG. 2 is a block diagram 200 of an example implementation of the global alignment generator circuitry 120 of FIG. 1. In the example of FIG. 2, the global alignment generator circuitry 120 includes the monocular depth estimator circuitry 125 of FIG. 1, the visual-inertial odometry sensor circuitry 130 of FIG. 1, an example depth estimate retriever circuitry 205, an example least-squares aligner circuitry 210, an example global scale/global shift generator circuitry 215, and/or an example data storage 220. The monocular depth estimator circuitry 125, the visual-inertial odometry sensor circuitry 130, the depth estimate retriever circuitry 205, the least-squares aligner circuitry 210, the global scale/global shift generator circuitry 215, and/or the data storage 220 are in communication using an example bus 225.

The monocular depth estimator circuitry 125 performs monocular depth estimation, as described in connection with FIG. 1. For example, the monocular depth estimator circuitry 125 predicts depth from a monocular image (e.g., single RGB image 105). In the example of FIG. 2, the monocular depth estimator circuitry 125 includes a pre-trained model that produces a dense depth map up to a specified scale (e.g., depth estimation model 265). In some examples, a depth estimator can be selected (e.g., DPT-Hybrid, etc.) and a transformer-based model trained on a large meta-dataset using scale- and shift-invariant losses. In some examples, in addition to using a DPT-Hybrid depth estimator, a DPT-Large depth estimator can be used for higher depth estimation accuracy while a machine-learning framework such as MiDaS-small can be selected for computational efficiency, as described in connection with FIG. 12. As illustrated in FIG. 2, the monocular depth estimator circuitry 125 is in communication with a first computing system 230 that trains a neural network. As disclosed herein, the monocular depth estimator circuitry 125 implements a neural network model to generate the depth estimation model 265 (e.g., using one or more predefined depth estimator network(s) such as DPT-Hybrid, DPT-Large, etc.).

In some examples, the apparatus includes means for estimating using monocular depth estimation. For example, the means for estimating using monocular depth estimation may be implemented by the monocular depth estimator circuitry 125. In some examples, the monocular depth estimator circuitry 125 may be implemented by machine executable instructions such as that implemented by at least blocks 415, 420, 425 of FIG. 4 executed by processor circuitry, which may be implemented by the example processor circuitry 1812 of FIG. 18, the example processor circuitry 2200 of FIG. 22, and/or the example Field Programmable Gate Array (FPGA) circuitry 2300 of FIG. 23. In other examples, the monocular depth estimator circuitry 125 is implemented by other hardware logic circuitry, hardware implemented state machines, and/or any other combination of hardware, software, and/or firmware. For example, the monocular depth estimator circuitry 125 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, deep neural network models are used. In general, machine learning models/architectures that are suitable to use in the example approaches disclosed herein can be based on supervised learning and/or semi-supervised learning. In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, training can be performed based on early stopping principles in which training continues until the model(s) stop improving. In examples disclosed herein, training can be performed remotely or locally. In some examples, training may initially be performed remotely. Further training (e.g., retraining) may be performed locally based on data generated as a result of execution of the models. Training is performed using hyperparameters that control how the learning is performed (e.g., a learning rate, a number of layers to be used in the machine learning model, etc.). In examples disclosed herein, hyperparameters that control complexity of the model(s), performance, duration, and/or training procedure(s) are used. Such hyperparameters are selected by, for example, random searching and/or prior knowledge. In some examples re-training may be performed. Such re-training may be performed in response to new input datasets, drift in the model performance, and/or updates to model criteria and system specifications.

Training is performed using training data. In examples disclosed herein, the training data originates from previously generated images that include identified objects. If supervised training is used, the training data is labeled. In example disclosed herein, labeling is applied to training data based on, for example, the number of objects in the image data, etc. In some examples, the training data is sub-divided such that a portion of the data is used for validation purposes. Once training is complete, the model(s) are stored in one or more databases (e.g., data storage 220 of FIG. 2 and/or databases 235, 260 of FIG. 2).

Once trained, the deployed model(s) may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.). In some examples, output of the deployed model(s) may be captured and provided as feedback. By analyzing the feedback, an accuracy of the deployed model(s) can be determined. If the feedback indicates that the accuracy of the deployed model(s) is less than a threshold or other criterion, training of an updated model can be triggered using the feedback and an updated training data set, hyperparameters, etc., to generate an updated, deployed model(s).

As shown in FIG. 2, the first computing system 230 trains a neural network to generate a depth estimation model 265 based on the input image (e.g., single RGB image 105). The example computing system 230 includes a neural network processor 255. In examples disclosed herein, the neural network processor 255 implements a first neural network. The example first computing system 230 of FIG. 2 includes a first neural network trainer 250. The example first neural network trainer 250 of FIG. 2 performs training of the neural network implemented by the first neural network processor 255. The example first computing system 230 of FIG. 2 includes a first training controller 245. The example training controller 245 instructs the first neural network trainer 250 to perform training of the neural network based on first training data 240. In the example of FIG. 2, the first training data 240 used by the first neural network trainer 250 to train the neural network is stored in a database 235. The example database 235 of the illustrated example of FIG. 2 is implemented by any memory, storage device and/or storage disc for storing data such as, for example, flash memory, magnetic media, optical media, etc. Furthermore, the data stored in the example database 235 may be in any data format such as, for example, binary data, comma delimited data, tab delimited data, structured query language (SQL) structures, image data, etc. While the illustrated example database 235 is illustrated as a single element, the database 235 and/or any other data storage elements described herein may be implemented by any number and/or type(s) of memories.

In the example of FIG. 2, the training data 240 can include image data including scene(s) with a spatial structure. For example, the training data 240 can include depth estimation of the spatial structure of a scene that recovers the three-dimensional shape(s) of the original image. The first neural network trainer 250 trains the neural network implemented by the neural network processor 255 using the training data 240. Based on the spatial information in the training data 240, the first neural network trainer 250 trains the neural network to recognize and/or extract depth estimates associated with the input image(s). The depth estimation model 265 is generated as a result of the neural network training. The depth estimation model 265 is stored in a database 260. The databases 235, 260 may be the same storage device or different storage devices. The monocular depth estimator circuitry 125 executes the depth estimation model 265 to determine a depth estimation associated with the single RGB image 105, as described in connection with FIG. 1.

The visual-inertial odometry sensor circuitry 130 of FIG. 1 uses IMU data 115 together with visual data (e.g., RGB sequence 110) to determine metric scale (e.g., output the metric sparse depth 145 and/or the dense scale map scaffolding 160 of FIG. 1). As described in connection with FIG. 1, the visual-inertial odometry sensor circuitry 130 can include a real-time monocular visual-inertial state estimator (e.g., VINS-Mono, etc.). For example, the visual-inertial odometry sensor circuitry 130 generates a sequence of sparse maps containing metric depth values (e.g., sparse depth location(s) image 184). The sparse depth maps serve as input(s) to the scale aligner circuitry 150, propagating information about metric scale throughout the depth estimation pipeline 100.

In some examples, the apparatus includes means for estimating using visual-inertial odometry. For example, the means for estimating using visual-inertial odometry may be implemented by the visual-inertial odometry sensor circuitry 130. In some examples, the means for estimating using visual-inertial odometry includes determining dense scale map scaffolding based on inertial measurement unit (IMU) data and visual data. In some examples, the means for estimating using visual-inertial odometry includes generating a sequence of sparse maps based on the IMU data and the visual data, the sequence of sparse maps including metric depth values, the dense scale map scaffolding based on the metric depth values. In some examples, the visual-inertial odometry sensor circuitry 130 may be implemented by machine executable instructions such as that implemented by at least blocks 440, 445 of FIG. 4 executed by processor circuitry, which may be implemented by the example processor circuitry 1812 of FIG. 18, the example processor circuitry 2200 of FIG. 22, and/or the example Field Programmable Gate Array (FPGA) circuitry 2300 of FIG. 23. In other examples, the visual-inertial odometry sensor circuitry 130 is implemented by other hardware logic circuitry, hardware implemented state machines, and/or any other combination of hardware, software, and/or firmware. For example, the visual-inertial odometry sensor circuitry 130 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The depth estimate retriever circuitry 205 receives the depth estimate output generated by the monocular depth estimator circuitry 125. For example, the depth estimate can be based on the depth estimation model 265 associated with the monocular depth estimator circuitry 125. In some examples, the depth estimate retriever circuitry 205 identifies an estimated depth value (e.g., a distance relative to the camera) of each pixel given a single (monocular) RGB image, which is further used as input for the global alignment phase of the visual-inertial depth estimation pipeline 100 of FIG. 1.

In some examples, the apparatus includes means for retrieving a depth estimate. For example, the means for retrieving a depth estimate may be implemented by the depth estimate retriever circuitry 205. In some examples, the depth estimate retriever circuitry 205 may be implemented by machine executable instructions such as that implemented by at least blocks 425, 430 of FIG. 4 executed by processor circuitry, which may be implemented by the example processor circuitry 1812 of FIG. 18, the example processor circuitry 2200 of FIG. 22, and/or the example Field Programmable Gate Array (FPGA) circuitry 2300 of FIG. 23. In other examples, the depth estimate retriever circuitry 205 is implemented by other hardware logic circuitry, hardware implemented state machines, and/or any other combination of hardware, software, and/or firmware. For example, the depth estimate retriever circuitry 205 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The least-squares aligner circuitry 210 performs least-squares estimation for global scale and shift 140 as part of the depth estimation pipeline 100 of FIG. 1. For example, the least-squares aligner circuitry 210 receives input from the monocular depth estimator circuitry 125 (e.g., obtained using the depth estimate retriever circuitry 205) and/or the visual-inertial odometry sensor circuitry 130. In some examples, the least-squares aligner circuitry 210 determines a per-frame global scale and global shift (e.g., bringing depth values to a correct order of magnitude and/or undoing a potential bias and/or offset in the original prediction). For example, assuming z represents a unit-less affine-invariant inverse depth that is output by a robust monocular depth estimation model (e.g., using the monocular depth estimator circuitry 125), the least-squares aligner circuitry 210 reintroduces metric scale into depth by aligning monocular depth estimates to sparse metric depth obtained through the visual-inertial odometry sensor circuitry 130. The least-squares aligner circuitry 210 performs this global alignment in inverse depth space based on a least-squares criterion. The result is a per-frame global scale ($s_g$) and global shift ($t_g$) that are applied to z as a linear transformation. The resulting globally aligned depth estimate(s) ($\hat{z}$) can be expressed in accordance with Equation 1:

$$\hat{z} = s_g z + t_g \qquad \text{Equation 1}$$

In some examples, the apparatus includes means for performing least-squares estimation for global scale and shift. For example, the means for performing least-squares estimation for global scale and shift may be implemented by the least-squares aligner circuitry 210. In some examples, the least-squares aligner circuitry 210 may be implemented by machine executable instructions such as that implemented by at least block 430 of FIG. 4 executed by processor circuitry, which may be implemented by the example processor circuitry 1812 of FIG. 18, the example processor circuitry 2200 of FIG. 22, and/or the example Field Programmable Gate Array (FPGA) circuitry 2300 of FIG. 23. In other examples, the least-squares aligner circuitry 210 is implemented by other hardware logic circuitry, hardware implemented state machines, and/or any other combination of hardware, software, and/or firmware. For example, the least-squares aligner circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The global scale/global shift generator circuitry 215 determines the output associated with the globally aligned depth estimate(s) determined using the least-squares aligner circuitry 210. For example, the global scale/global shift generator circuitry 215 generates the globally-aligned depth prediction 155 associated with the original single RGB 105, RGB sequence 110, and/or associated inertial measurement unit(s) (IMUs). The globally-aligned depth prediction 155 can be used as input into the scale aligner circuitry 150 as part of the learning-based dense (local) scale alignment phase of the depth estimation pipeline 100 of FIG. 1, as described in more detail in connection with FIG. 3.

In some examples, the apparatus includes means for generating globally aligned depth estimates. For example, the means for generating globally aligned depth estimates may be implemented by the global scale/global shift generator circuitry 215. In some examples, the global scale/global shift generator circuitry 215 may be implemented by machine executable instructions such as that implemented by at least block 435 of FIG. 4 executed by processor circuitry, which may be implemented by the example processor circuitry 1812 of FIG. 18, the example processor circuitry 2200 of FIG. 22, and/or the example Field Programmable Gate Array (FPGA) circuitry 2300 of FIG. 23. In other examples, the global scale/global shift generator circuitry 215 is implemented by other hardware logic circuitry, hardware implemented state machines, and/or any other combination of hardware, software, and/or firmware. For example, the global scale/global shift generator circuitry 215 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The data storage 220 can be used to store any information associated with the monocular depth estimator circuitry 125, visual-inertial odometry sensor circuitry 130, depth estimate retriever circuitry 205, least-squares aligner circuitry 210, and/or global scale/global shift generator circuitry 215. The example data storage 220 of the illustrated example of FIG. 2 can be implemented by any memory, storage device and/or storage disc for storing data such as flash memory, magnetic media, optical media, etc. Furthermore, the data stored in the example data storage 220 can be in any data format such as binary data, comma delimited data, tab delimited data, structured query language (SQL) structures, image data, etc.

While an example manner of implementing the global alignment generator circuitry 120 is illustrated in FIG. 2, one or more of the elements, processes and/or devices illustrated in FIG. 2 may be combined, divided, re-arranged, omitted, eliminated and/or implemented in any other way. Further, the example monocular depth estimator circuitry 125, the example visual-inertial odometry sensor circuitry 130, the example depth estimate retriever circuitry 205, the example least-squares aligner circuitry 210, the example global scale/global shift generator circuitry 215, and/or, more generally, the example global alignment generator circuitry 120 of FIG. 2 may be implemented by hardware, software, firmware and/or any combination of hardware, software and/or firmware. Thus, for example, any of the example monocular depth estimator circuitry 125, the example visual-inertial odometry sensor circuitry 130, the example depth estimate retriever circuitry 205, the example least-squares aligner circuitry 210, the example global scale/global shift generator circuitry 215, and/or, more generally, the example global alignment generator circuitry 120 of FIG. 2, could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example monocular depth estimator circuitry 125, the example visual-inertial odometry sensor circuitry 130, the example depth estimate retriever circuitry 205, the example least-squares aligner circuitry 210, and/or the example global scale/global shift generator circuitry 215 is/are hereby expressly defined to include a non-transitory computer readable storage device or storage disk such as a memory, a digital versatile disk (DVD), a compact disk (CD), a Blu-ray disk, etc. including the software and/or firmware. Further still, the example global alignment generator circuitry 120 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the first computing system 230 is illustrated in FIG. 2, one or more of the elements, processes and/or devices illustrated in FIG. 2 may be combined, divided, re-arranged, omitted, eliminated and/or implemented in any other way. Further, the example neural network processor 255, the example trainer 250, the example training controller 245, the example database(s) 235, 260 and/or, more generally, the example first computing system 230 of FIG. 2 may be implemented by hardware, software, firmware and/or any combination of hardware, software and/or firmware. Thus, for example, any of the example neural network processor 255, the example trainer 250, the example training controller 245, the example database(s) 235, 260, and/or more generally the example first computing system 230 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 255, the example trainer 250, the example training controller 245, and/or the example database(s) 235, 260 is/are hereby expressly defined to include a non-transitory computer readable storage device or storage disk such as a memory, a digital versatile disk (DVD), a compact disk (CD), a Blu-ray disk, etc. including the software and/or firmware. Further still, the example first computing system 230 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
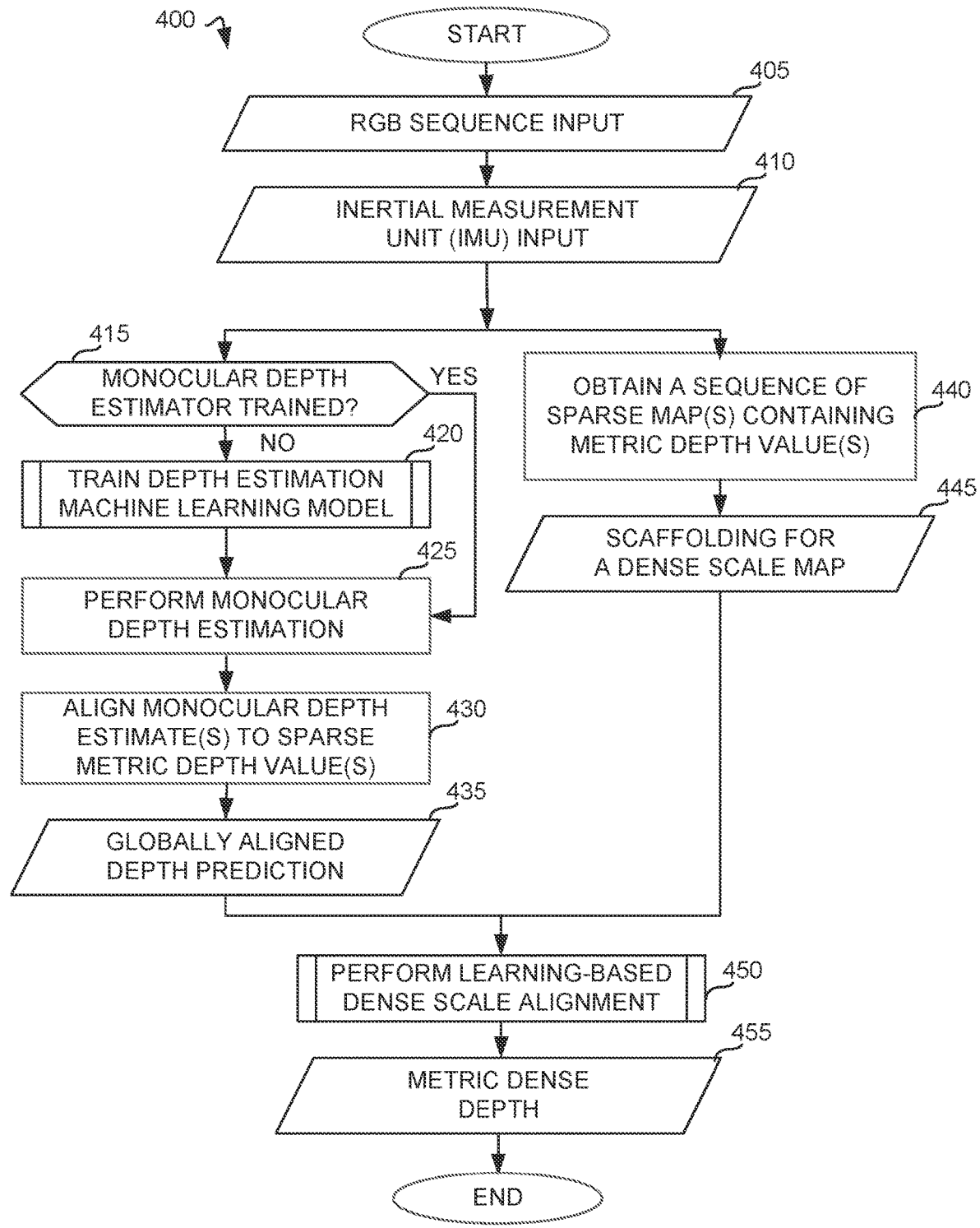
FIG. 4 is a flowchart representative of example machine readable instructions which may be executed to implement the example global alignment generator circuitry of FIG. 1.
Figure 5:
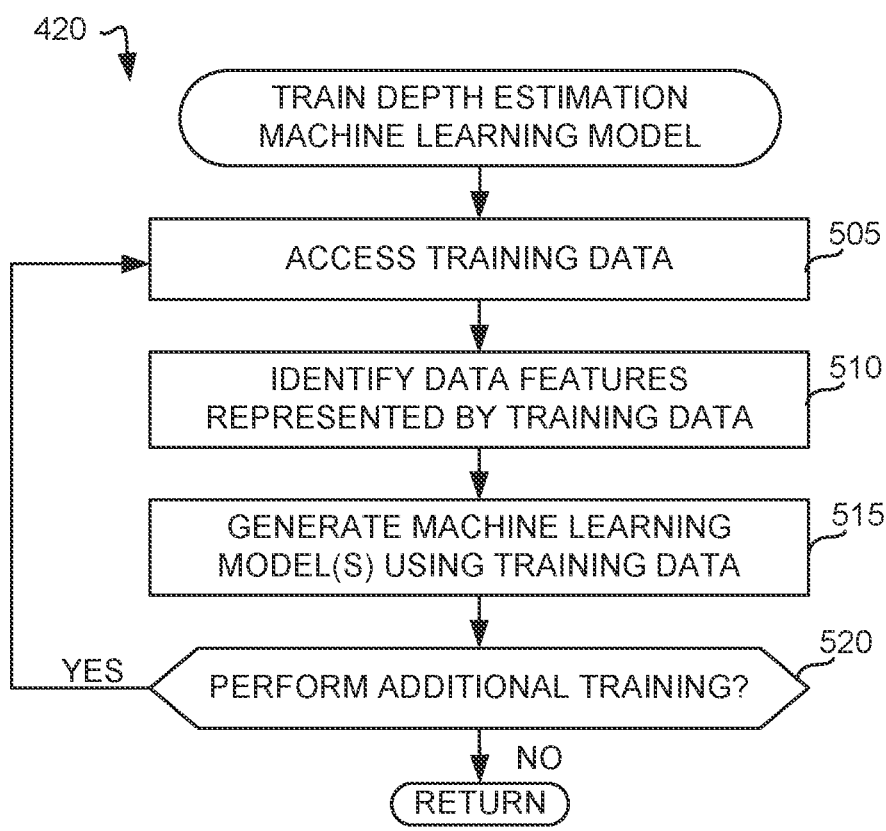
FIG. 5 is a flowchart representative of example machine readable instructions which, when executed by a computing system of FIG. 2, cause the computing system to train a neural network to perform depth estimation.

A flowchart representative of example hardware logic, machine readable instructions, hardware implemented state machines, and/or any combination thereof for implementing the global alignment generator circuitry 120 of FIG. 2 is shown in FIG. 4. A flowchart representative of example hardware logic, machine readable instructions, hardware implemented state machines, and/or any combination thereof for implementing the example first computing system 230 of FIG. 2 is shown in FIG. 5. The machine readable instructions may be an executable program or portion of an executable program for execution by a computer processor such as the processor(s) 1812, 1912 shown in the example processor platform(s) 1800, 1900 discussed below in connection with FIGS. 18-19. The program(s) may be embodied in software stored on a non-transitory computer readable storage medium such as a CD-ROM, a floppy disk, a hard drive, a DVD, a Blu-ray disk, or a memory associated with the processor(s) 1812, 1912 but the entire program and/or parts thereof could alternatively be executed by a device other than the processor(s) 1812, 1912 and/or embodied in firmware or dedicated hardware.

Figure 3:
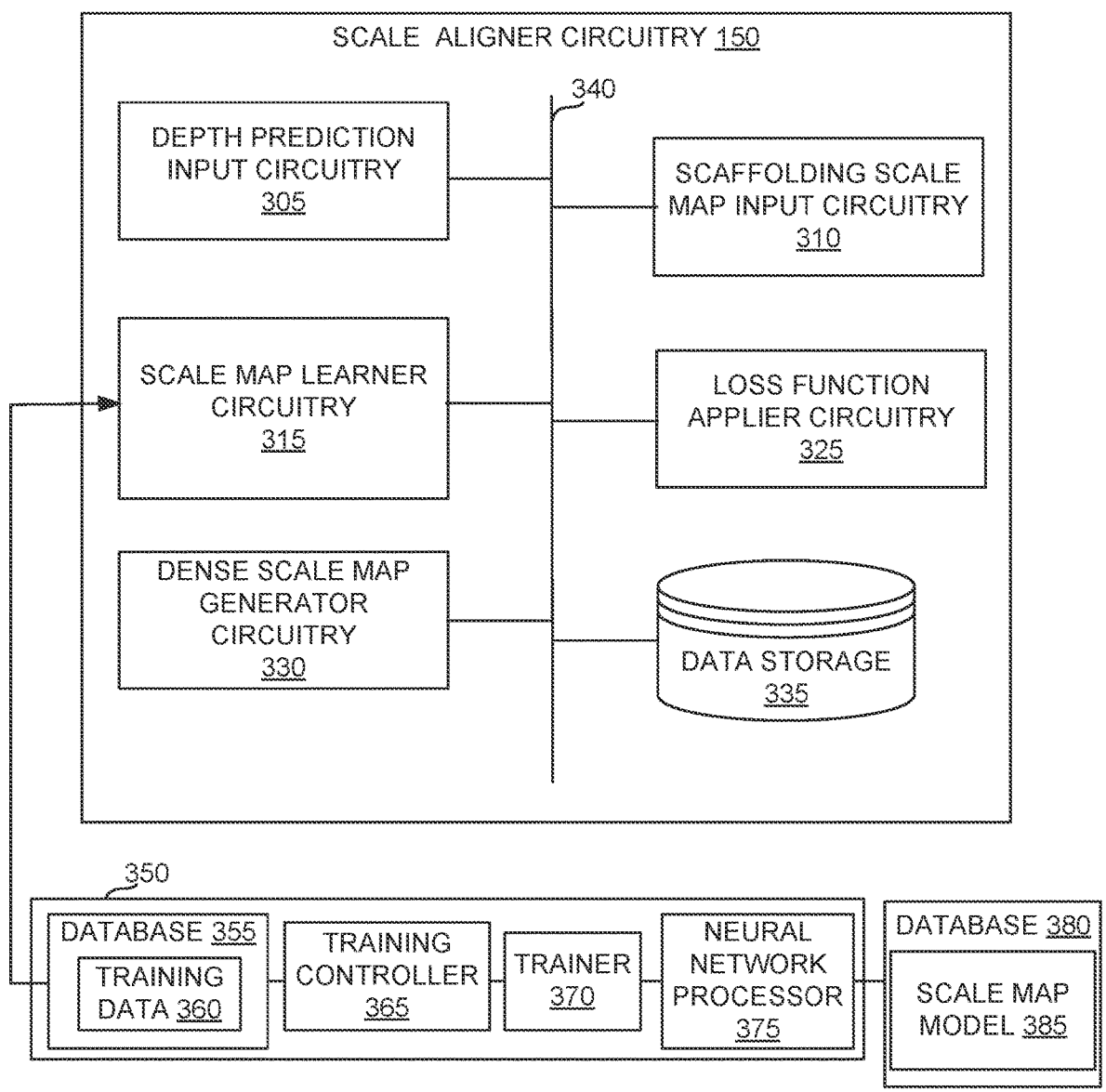
FIG. 3 is a block diagram of an example implementation of the scale aligner circuitry of FIG. 1.

FIG. 3 is a block diagram 300 of an example implementation of the scale aligner circuitry 150 of FIG. 1. In the example of FIG. 3, the scale aligner circuitry 150 includes an example depth prediction input circuitry 305, an example scaffolding scale map input circuitry 310, an example scale map learner circuitry 315, an example loss function applier circuitry 325, an example dense scale map generator circuitry 330, and/or an example data storage 335. The depth prediction input circuitry 305, the scaffolding scale map input circuitry 310, the scale map learner circuitry 315, the loss function applier circuitry 325, the dense scale map generator circuitry 330, and/or the data storage 335 are in communication using an example bus 340.

The depth prediction input circuitry 305 receives the globally-aligned depth prediction 155 input generated using the global scale/global shift generator circuitry 215 based on the least-squares estimation for global scale and shift 140. For example, the depth prediction input circuitry 305 receives the globally-aligned depth prediction 155 associated with the original single RGB 105, RGB sequence 110, and/or the associated inertial measurement unit(s) (IMU) 115 of FIG. 1.

In some examples, the apparatus includes means for accessing a globally-aligned depth prediction. For example, the means for accessing a globally-aligned depth prediction may be implemented by the depth prediction input circuitry 305. In some examples, the depth prediction input circuitry 305 may be implemented by machine executable instructions such as that implemented by at least block 450 of FIG. 4 executed by processor circuitry, which may be implemented by the example processor circuitry 2012 of FIG. 20, the example processor circuitry 2200 of FIG. 22, and/or the example Field Programmable Gate Array (FPGA) circuitry 2300 of FIG. 23. In other examples, the depth prediction input circuitry 305 is implemented by other hardware logic circuitry, hardware implemented state machines, and/or any other combination of hardware, software, and/or firmware. For example, the depth prediction input circuitry 305 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The scaffolding scale map input circuitry 310 generates a dense map scaffolding input 160 to be used as part of the ScaleMapLearner (SML) network 165. For example, globally aligned depth alone may not be sufficient for the network 165 to learn dense scale regression well. As such, the scaffolding scale map input circuitry 310 generates an input scale map scaffolding. For example, the scale map scaffolding represents an initial assessment of the dense scale map that the network 165 is learning to regress. Without an accompanying scale map input, confidence mapping may negligibly improve SML-based learning. For example, confidence mapping can be representative of regions in the input depth (e.g., globally-aligned depth prediction 155) and scale scaffolding (e.g., dense map scaffolding input 160) that are identified as more trustworthy.

In some examples, the apparatus includes means for accessing a dense scale map scaffolding. For example, the means for accessing a dense scale map scaffolding may be implemented by the scaffolding scale map input circuitry 310. In some examples, the scaffolding scale map input circuitry 310 may be implemented by machine executable instructions such as that implemented by at least block 450 of FIG. 4 executed by processor circuitry, which may be implemented by the example processor circuitry 2012 of FIG. 20, the example processor circuitry 2200 of FIG. 22, and/or the example Field Programmable Gate Array (FPGA) circuitry 2300 of FIG. 23. In other examples, the scaffolding scale map input circuitry 310 is implemented by other hardware logic circuitry, hardware implemented state machines, and/or any other combination of hardware, software, and/or firmware. For example, the scaffolding scale map input circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The scale map learner circuitry 315 can be trained (e.g., using an open-source machine learning framework such as MiDaS-small, etc.) to realign individual values in an input depth map to improve metric accuracy. In some examples, the scale map learner circuitry 315 can receive an input of two concatenated data channels, such as the globally aligned depth prediction 155 (e.g., $\tilde{z}$) and/or a scaffolding for a dense scale map (e.g., dense scale map scaffolding 160 based on a metric sparse depth 145 output by the visual-inertial odometry sensor circuitry 130), where n locations of known sparse depth values v from VIO define n scale anchor points $v_i/\tilde{z}_i$, $i \in \{1 \ldots n\}$, as described in more detail in connection with FIG. 2. For example, a region within the convex hull determined by the anchors is filled via linear interpolation of anchor values while the region outside the convex hull is filled with an identity scale value of 1. The scale map learner circuitry 315 regresses the dense scale residual map 170 and a resulting scale map can be generated and applied to the input depth (e.g., using the dense scale map generator circuitry 330). For example, the scale map learner circuitry 315 regresses a dense scale residual map r where values can be negative. In examples disclosed herein, the resulting scale map can be represented as ReLU (1+r) and applied to the input depth $\tilde{z}$ to produce the output depth $\hat{z}$=ReLU (1+r)$\tilde{z}$. In the example of FIG. 3, the scale map learner circuitry 315 is in communication with a second computing system 350 that trains a neural network. As disclosed herein, the scale map learner circuitry 315 implements a neural network model to generate the scale map model 385 (e.g., using an open-source machine learning framework such as MiDaS-small, etc.).

In some examples, the apparatus includes means for regressing a dense scale residual map determined using the globally-aligned depth prediction and the dense scale map scaffolding. For example, the means for regressing may be implemented by the scale map learner circuitry 315. In some examples, the scale map learner circuitry 315 may be implemented by machine executable instructions such as that implemented by at least blocks 605, 610, 615 of FIG. 6 executed by processor circuitry, which may be implemented by the example processor circuitry 2012 of FIG. 20, the example processor circuitry 2200 of FIG. 22, and/or the example Field Programmable Gate Array (FPGA) circuitry 2300 of FIG. 23. In other examples, the scale map learner circuitry 315 is implemented by other hardware logic circuitry, hardware implemented state machines, and/or any other combination of hardware, software, and/or firmware. For example, the scale map learner circuitry 315 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

As shown in FIG. 3, the second computing system 350 trains a neural network to generate a scale map model 385. The example computing system 350 includes a neural network processor 375. In examples disclosed herein, the neural network processor 375 implements a second neural network. The example second computing system 350 of FIG. 3 includes a second neural network trainer 370. The example second neural network trainer 370 of FIG. 3 performs training of the neural network implemented by the second neural network processor 375. The example second computing system 350 of FIG. 3 includes a second training controller 365. The example training controller 365 instructs the second neural network trainer 370 to perform training of the neural network based on first training data 360. In the example of FIG. 3, the first training data 360 used by the second neural network trainer 370 to train the neural network is stored in a database 380. The example database 380 of the illustrated example of FIG. 3 is implemented by any memory, storage device and/or storage disc for storing data such as, for example, flash memory, magnetic media, optical media, etc. Furthermore, the data stored in the example database 380 may be in any data format such as, for example, binary data, comma delimited data, tab delimited data, structured query language (SQL) structures, image data, etc. While the illustrated example database 380 is illustrated as a single element, the database 380 and/or any other data storage elements described herein may be implemented by any number and/or type(s) of memories.

In the example of FIG. 3, the second neural network trainer 370 trains the neural network implemented by the neural network processor 375 using the training data 360. Based on the information in the training data 360, the second neural network trainer 370 trains the neural network to generate a scale map model 385. The scale map model 385 is generated as a result of the neural network training. The scale map model 385 is stored in a database 380. The databases 355, 380 may be the same storage device or different storage devices. The scale map learner circuitry 315 executes the scale map model 385 to determine a scale map model associated with the globally aligned depth prediction 155 and/or the scaffolding for a dense scale map (e.g., dense scale map scaffolding 160), as shown in connection with FIG. 1.

In some examples, the apparatus includes means for training to train a scale map learner (SML) neural network to resolve the scale ambiguity in monocular depth estimates. For example, the means for training may be implemented by the second neural network trainer 370. In some examples, the second neural network trainer 370 may be implemented by machine executable instructions such as that implemented by at least block 603 of FIG. 6 executed by processor circuitry, which may be implemented by the example processor circuitry 2112 of FIG. 21, the example processor circuitry 2200 of FIG. 22, and/or the example Field Programmable Gate Array (FPGA) circuitry 2300 of FIG. 23. In other examples, the second neural network trainer 370 is implemented by other hardware logic circuitry, hardware implemented state machines, and/or any other combination of hardware, software, and/or firmware. For example, the second neural network trainer 370 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, acquiring training data for the SML network 165 (e.g., training data 360) can present a challenge due to a lack of RGB-D datasets containing IMU sequences. For example, IMU data can be used to execute visual-inertial odometry (VIO) to generate sparse metric depth. In some examples, simulators can be used that allow for recording of synchronized RGB-D and IMU data (e.g., an AirSim simulator, a cross-platform simulator for drones, ground vehicles, etc.). However, manually gathering sufficient training data can be difficult. In examples disclosed herein, TartanAir (e.g., a dataset used for robot navigation tasks, etc.) permits access to a large size and variety of outdoor and indoor environment sequences. However, IMU data is not provided in the TartanAir dataset. To proxy sparse depth map generation, an implementation of the VINS-Mono feature tracker front-end can be used to obtain sparse feature locations and sample ground truth depth at those locations. For examples, a 70%-30% train-test split for TartanAir can be implemented, with 172,000 training samples and 73,000 test samples taken from both easy and hard sequences. In addition to the synthetic TartanAir dataset, real-world data can be collected using an Intel RealSense D435i camera and/or a visual-inertial odometry system (e.g., XIVO, an open-source repository for visual-inertial odometry/mapping). In some examples, the XIVO dataset can be smaller than the TartanAir dataset (e.g., containing only 47 samples for training and 800 samples for testing). In some examples, a default train-test split of the dataset can be used to perform experiments at three available density settings (e.g., 150, 500, and 1500 points).

Figure 9:
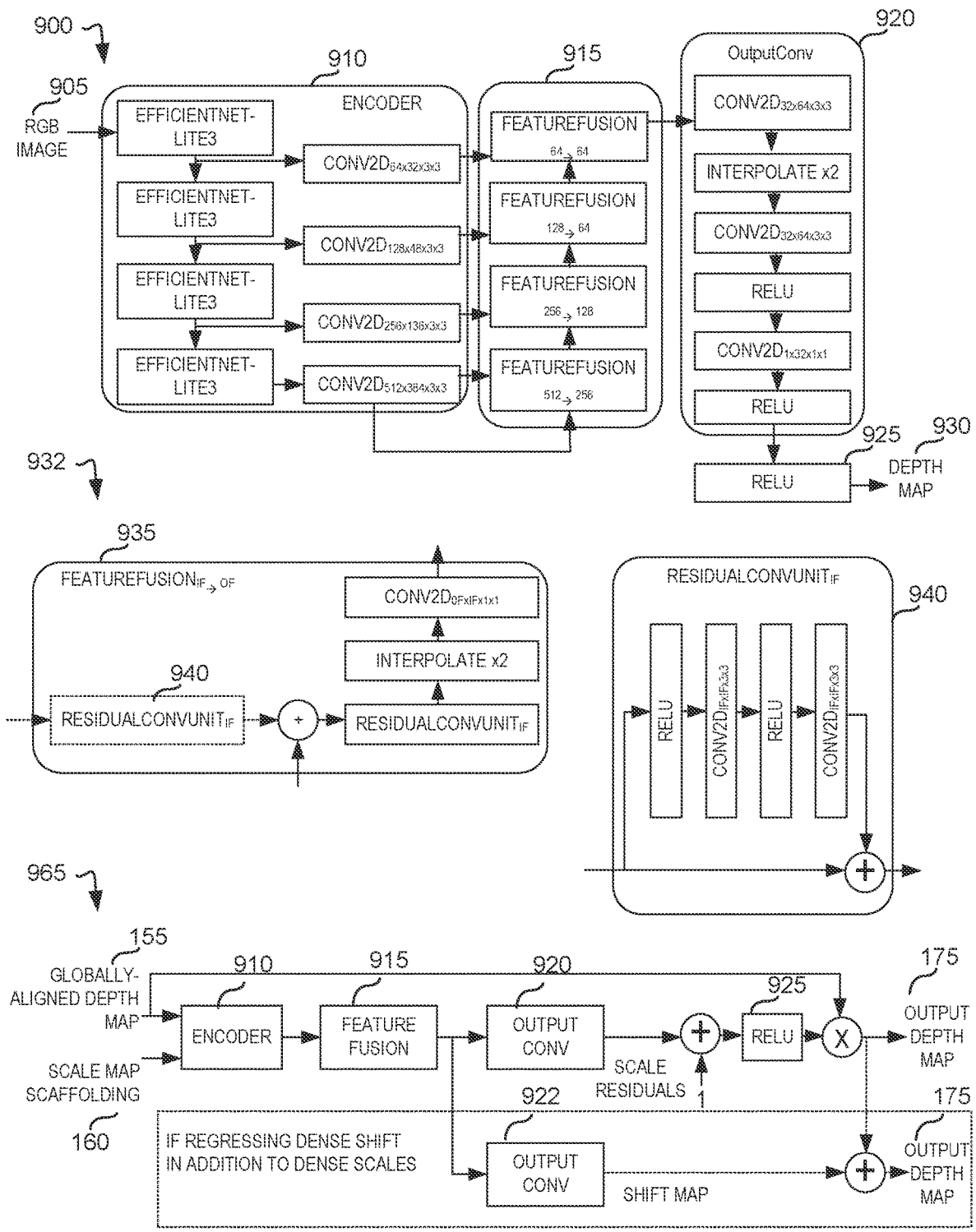
FIG. 9 illustrates an example network architecture used in conjunction with the visual-inertial depth estimation pipeline of FIG. 1.

In examples disclosed herein, the SML network 165 (e.g., based on the scale map learner circuitry 315) can be constructed using a MiDaS family of monocular depth estimation models (e.g., MiDaS-Small). For example, FIG. 9 provides an architecture diagram for MiDaS-Small and shows the SML network 165 using MiDaS-small blocks. For example, an encoder backbone can be initialized with pre-trained ImageNet weights, while other layers are initialized randomly. In examples disclosed herein, an adaptive optimizer can be implemented (e.g., AdamW with β1=0.9, β2=0.999, and λ=0.001). For example, an initial learning rate of $5 \times 10^{-4}$ can be used when training on TartanAir and an initial learning rate of $3 \times 10^{-4}$ can be used when training on visual odometry with inertial and depth (VOID) dataset samples. In some examples, a step-based scheduler can be used that halves the learning rate after 5 epochs on TartanAir and after 8 epochs on VOID. Furthermore, training can be performed for 20 epochs on a node with 8 GeForce RTX 2080 Ti GPUs, with a batch size of 256, and with mixed-precision training enabled. In examples disclosed herein, input data can be resized and cropped to a training resolution of 384×384, with the training taking about 4 hours on a larger TartanAir dataset split.

Training-based evaluation can be performed using inverse depth space, as doing so penalizes error at closer depth ranges more significantly. An inverse mean absolute error (iMAE), inverse root mean squared error (iRMSE), and/or inverse absolute relative error (iAbsRel) can be determined as shown in connection with Equations 2-4:

$$iMAE = \frac{1}{M}\sum_{i=1}^{M} |z_i^* - \hat{z}_i|$$ Equation 2

$$iRMSE = \sqrt{\frac{1}{M}\sum_{i=1}^{M} |z_i^* - \hat{z}_i|^2}$$ Equation 3

$$iAbsRel = \frac{1}{M}\sum_{i=1}^{M} |z_i^* - \hat{z}_i|/z_i^*$$ Equation 4

For comparisons against related works on VOID, MAE and RMSE can be computed in regular depth space, as shown in connection with Equations 5-6:

$$MAE = \frac{1}{M}\sum_{i=1}^{M} |d_i^* - \hat{d}_i|$$ Equation 5

$$RMSE = \sqrt{\frac{1}{M}\sum_{i=1}^{M} |d_i^* - \hat{d}_i|^2}$$ Equation 6

In Equations 2-6, $d^*_i$ and $\hat{d}_i$ represent regular depth, while $z^*_i=1/d^*_i$ and $\hat{z}_i=1/\hat{d}_i$ represent inverse depth. In examples disclosed here, MAE and RMSE are represented in millimeters (mm) while iMAE and iRMSE are represented as 1/km (e.g., kilometers). Example training-based evaluations performed using inverse depth space and/or regular depth space are shown in connection with FIGS. 11, 12B, and/or 16. For example, when evaluating on VOID, ground truth depth can be identified as valid between 0.2 and 5.0 meters. In some examples, minimum and maximum depth prediction values can be set to 0.1 and 8.0 meters, respectively, such that depth predictions, both after global alignment and after applying regressed dense scale maps, can be limited to within this range. In contrast to the mostly indoor VOID scenes, many TartanAir scenes exhibit larger depth ranges (e.g., in city-like and landscape environments). When evaluating on TartanAir, valid ground truth depth can be defined to be between 0.2 and 50.0 meters, and with depth predictions between 0.1 and 80.0 meters.

The loss function applier circuitry 325 applies a loss function during training of the SML network 165 (e.g., based on the scale map learner circuitry 315). For example, the SML network 165 is supervised on metric ground truth z* in inverse depth space. Assuming M defines the number of pixels with valid ground truth, the loss function can include two terms: (1) an L1 loss term on depth (e.g., shown in Equation 7), and (2) a multiscale gradient matching term that biases discontinuities to coincide with discontinuities in ground truth (e.g., shown in Equation 8):

$$\mathcal{L}_{depth}(\hat{z}, z^*) = \frac{1}{M}\sum_{i=1}^{M} |z_i^* - \hat{z}_i|$$ Equation 7

$$\mathcal{L}_{grad}(\hat{z}, z^*) = \frac{1}{K}\sum_{k=1}^{K}\frac{1}{M}\sum_{i=1}^{M}(|\nabla_x R_i^k| + |\nabla_y R_i^k|)$$ Equation 8

In the example of Equations 7-8, $R_i=\hat{z}^*_i-z^*$ and $R^k$ denotes depth error at different resolutions. In examples disclosed herein, K=3 levels, such that the spatial resolution is halved at each level. The loss function applier circuitry 325 can represent the final loss as $\mathcal{L} = \mathcal{L}_{depth}+\alpha\mathcal{L}_{grad}$, with α=0.5.

In some examples, the apparatus includes means for applying the dense scale residual map to the globally-aligned depth prediction to resolve scale ambiguity in monocular depth estimates. For example, the means for applying the dense scale residual map to the globally-aligned depth prediction may be implemented by loss function applier circuitry 325. In some examples, the loss function applier circuitry 325 may be implemented by machine executable instructions such as that implemented by at least block 620 of FIG. 6 executed by processor circuitry, which may be implemented by the example processor circuitry 2012 of FIG. 20, the example processor circuitry 2200 of FIG. 22, and/or the example Field Programmable Gate Array (FPGA) circuitry 2300 of FIG. 23. In other examples, the loss function applier circuitry 325 is implemented by other hardware logic circuitry, hardware implemented state machines, and/or any other combination of hardware, software, and/or firmware. For example, the loss function applier circuitry 325 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The dense scale map generator circuitry 330 generates the dense scale map (e.g., final metric dense depth output 175) based on the learning-based dense (local) scale alignment performed using the scale map learner circuitry 315. In some examples, the dense scale map generator circuitry 330 generates a final metric dense depth output 175 (e.g., shown visually using the final depth map output 192) based on a regressed dense scale residual map 170 (e.g., dense scale map image 190 regressed by the SML network 165). The resulting scale map can be applied to the input depth, yielding the final metric dense depth output 175.

In some examples, the apparatus includes means for generating a dense scale map. For example, the means for generating a dense scale map may be implemented by the dense scale map generator circuitry 330. In some examples, the dense scale map generator circuitry 330 may be implemented by machine executable instructions such as that implemented by at least block 455 of FIG. 4 executed by processor circuitry, which may be implemented by the example processor circuitry 2012 of FIG. 20, the example processor circuitry 2200 of FIG. 22, and/or the example Field Programmable Gate Array (FPGA) circuitry 2300 of FIG. 23. In other examples, the dense scale map generator circuitry 330 is implemented by other hardware logic circuitry, hardware implemented state machines, and/or any other combination of hardware, software, and/or firmware. For example, the dense scale map generator circuitry 330 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The data storage 335 can be used to store any information associated with the depth prediction input circuitry 305, the scaffolding scale map input circuitry 310, the scale map learner circuitry 315, the loss function applier circuitry 325, and/or the dense scale map generator circuitry 330. The example data storage 335 of the illustrated example of FIG. 3 can be implemented by any memory, storage device and/or storage disc for storing data such as flash memory, magnetic media, optical media, etc. Furthermore, the data stored in the example data storage 335 can be in any data format such as binary data, comma delimited data, tab delimited data, structured query language (SQL) structures, image data, etc.

While an example manner of implementing the scale aligner circuitry 150 of FIG. 1 is illustrated in FIG. 3, one or more of the elements, processes, and/or devices illustrated in FIG. 3 may be combined, divided, re-arranged, omitted, eliminated, and/or implemented in any other way. Further, the example depth prediction input circuitry 305, the example scaffolding scale map input circuitry 310, the example scale map learner circuitry 315, the example loss function applier circuitry 325, the example dense scale map generator circuitry 330, and/or, more generally, the example scale aligner circuitry 150 of FIG. 1, may be implemented by hardware, software, firmware, and/or any combination of hardware, software, and/or firmware. Thus, for example, any of the example depth prediction input circuitry 305, the example scaffolding scale map input circuitry 310, the example scale map learner circuitry 315, the example loss function applier circuitry 325, the example dense scale map generator circuitry 330, and/or, more generally, the example scale aligner circuitry 150 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example depth prediction input circuitry 305, the example scaffolding scale map input circuitry 310, the example scale map learner circuitry 315, the example loss function applier circuitry 325, the example dense scale map generator circuitry 330, and/or, more generally, the example scale aligner circuitry 150 of FIG. 1 is/are hereby expressly defined to include a non-transitory computer readable storage device or storage disk such as a memory, a digital versatile disk (DVD), a compact disk (CD), a Blu-ray disk, etc., including the software and/or firmware. Further still, the example scale aligner circuitry 150 of FIG. 1 may include one or more elements, processes, and/or devices in addition to, or instead of, those illustrated in FIG. 3, and/or may include more than one of any or all of the illustrated elements, processes and devices.

Flowcharts representative of example hardware logic circuitry, machine readable instructions, hardware implemented state machines, and/or any combination thereof for implementing the scale aligner circuitry 150 of FIG. 1 are shown in FIG. 4 and/or 6. The machine readable instructions may be one or more executable programs or portion(s) of an executable program for execution by processor circuitry, such as the processor circuitry 2012 shown in the example processor platform 2000 discussed below in connection with FIG. 20 and/or the example processor circuitry discussed below in connection with FIGS. 22 and/or 23. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example scale aligner circuitry 150 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second", etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

While an example manner of implementing the second computing system 350 is illustrated in FIG. 3, one or more of the elements, processes and/or devices illustrated in FIG. 3 may be combined, divided, re-arranged, omitted, eliminated and/or implemented in any other way. Further, the example neural network processor 375, the example trainer 370, the example training controller 365, the example database(s) 355, 380 and/or, more generally, the example second computing system 350 of FIG. 3 may be implemented by hardware, software, firmware and/or any combination of hardware, software and/or firmware. Thus, for example, any of the neural network processor 375, the example trainer 370, the example training controller 365, the example database(s) 355, 380 and/or, more generally, the example second computing system 350 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the neural network processor 375, the example trainer 370, the example training controller 365, and/or the example database(s) 355, 380 is/are hereby expressly defined to include a non-transitory computer readable storage device or storage disk such as a memory, a digital versatile disk (DVD), a compact disk (CD), a Blu-ray disk, etc. including the software and/or firmware. Further still, the example second computing system 350 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
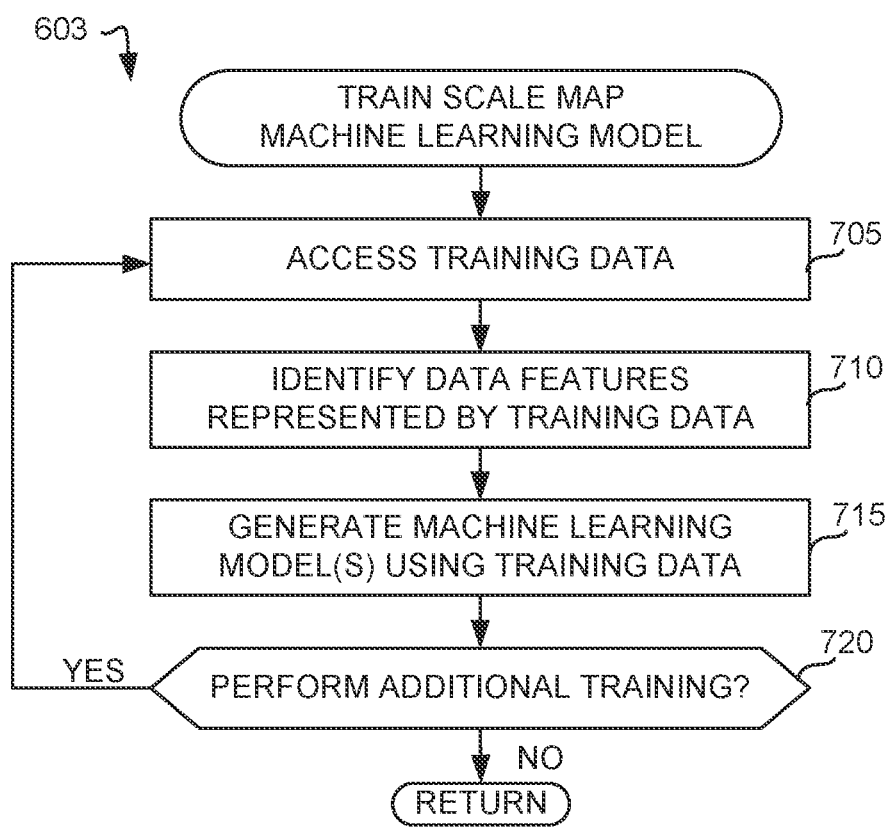
FIG. 7 is a flowchart representative of example machine readable instructions which, when executed by a computing system of FIG. 3, cause the computing system to train a neural network to perform scale mapping.

A flowchart representative of example hardware logic, machine readable instructions, hardware implemented state machines, and/or any combination thereof for implementing the example second computing system 350 of FIG. 3 is shown in FIG. 7. The machine-readable instructions may be an executable program or portion of an executable program for execution by a computer processor such as the processor 2112 shown in the example processor platform 2100 discussed below in connection with FIG. 21. The program(s) may be embodied in software stored on a non-transitory computer readable storage medium such as a CD-ROM, a floppy disk, a hard drive, a DVD, a Blu-ray disk, or a memory associated with the processor 2112 but the entire program and/or parts thereof could alternatively be executed by a device other than the processor 2112 and/or embodied in firmware or dedicated hardware.

FIG. 4 is a flowchart representative of example machine readable instructions 400 which may be executed to implement the example global alignment generator circuitry 120 of FIG. 1. In the example of FIG. 4, the global alignment generator circuitry 120 receives an input including the RGB sequence input 405 (e.g., the single RGB image 105 and/or the RGB image sequence 110) and/or the inertial measurement unit (IMU) input (e.g., the IMU data 115) (block 410). In the example of FIG. 4, the monocular depth estimator circuitry 125 can perform monocular depth estimation in parallel with the visual-inertial odometry sensor circuitry 130 performing visual-inertial odometry. For example, the monocular depth estimator circuitry 125 identifies whether the depth estimation model 265 has been trained (block 415). If the training is not initiated and/or not completed, control proceeds to the first computing system 230 to perform training of the depth estimation machine learning model (e.g., using the trainer 250) (block 420). Once the training is completed, the monocular depth estimator circuitry 125 performs monocular depth estimation (block 425). For example, the monocular depth estimator circuitry 125 predicts depth from a monocular image using the pretrained depth estimation machine learning model that takes in a single RGB image (e.g., RGB image 105) and produces a dense depth map up to a specified scale. Furthermore, the least-squares aligner circuitry 210 aligns monocular depth estimate(e) to sparse metric depth value(s) (block 430). For example, the least-squares aligner circuitry 210 performs least-squares estimation for global scale and shift 140 to determine a per-frame global scale and global shift. In some examples, the least-squares aligner circuitry 210 reintroduces metric scale into depth by aligning monocular depth estimates to sparse metric depth obtained through the visual-inertial odometry sensor circuitry 130. The global scale/global shift generator circuitry 215 generates the resulting globally aligned depth prediction (block 435), producing a per-frame global scale ($s_g$) and global shift ($t_g$), as described in more detail in connection with FIG. 2.

In parallel with the generation of the globally aligned depth prediction shown in FIG. 4, the visual-inertial odometry sensor circuitry 130 obtains a sequence of sparse map(s) containing metric depth value(s) (block 440). For example, the visual-inertial odometry sensor circuitry 130 uses IMU data 115 together with visual data (e.g., RGB sequence 110) to determine metric scale. By projecting the feature coordinates to the image space, the visual-inertial odometry sensor circuitry 130 generates a sequence of sparse maps containing metric depth values (e.g., sparse depth location(s) image 184). These sparse depth maps serve as inputs to later alignment tasks, propagating information about metric scale throughout the rest of the depth estimation pipeline 100 using the scaffolding for a dense scale map output (e.g., dense scale map scaffolding 160 of FIG. 1) (block 445). The scale aligner circuitry 150 performs learning-based dense scale alignment (block 450), as described in more detail in connection with FIG. 6. For example, the scale aligner circuitry 150 can be used to perform dense (local) scale alignment given that global alignment may not adequately resolve metric scale in all regions of a depth map. In the example of FIG. 4, the dense scale map generator circuitry 330 outputs the metric dense depth (block 455) based on the scale alignment performed using the scale map learner circuitry 315 of FIG. 3.

FIG. 5 is a flowchart representative of example machine readable instructions 420 which, when executed by a computing system of FIG. 2, cause the computing system to train a neural network to perform depth estimation. In the example of FIG. 5, the trainer 250 accesses training data 240 (block 505). The training data 240 can include image data including scene(s) with a spatial structure. For example, the training data 240 can include depth estimation of the spatial structure of a scene that recovers the three-dimensional shape(s) of the original image. The trainer 250 identifies data features represented by the training data 240 (block 510). The training controller 245 instructs the trainer 250 to perform training of the neural network using the training data 240 to generate a depth estimation model 265 (block 515). In some examples, additional training is performed to refine the model 265 (block 520).

Figure 6:
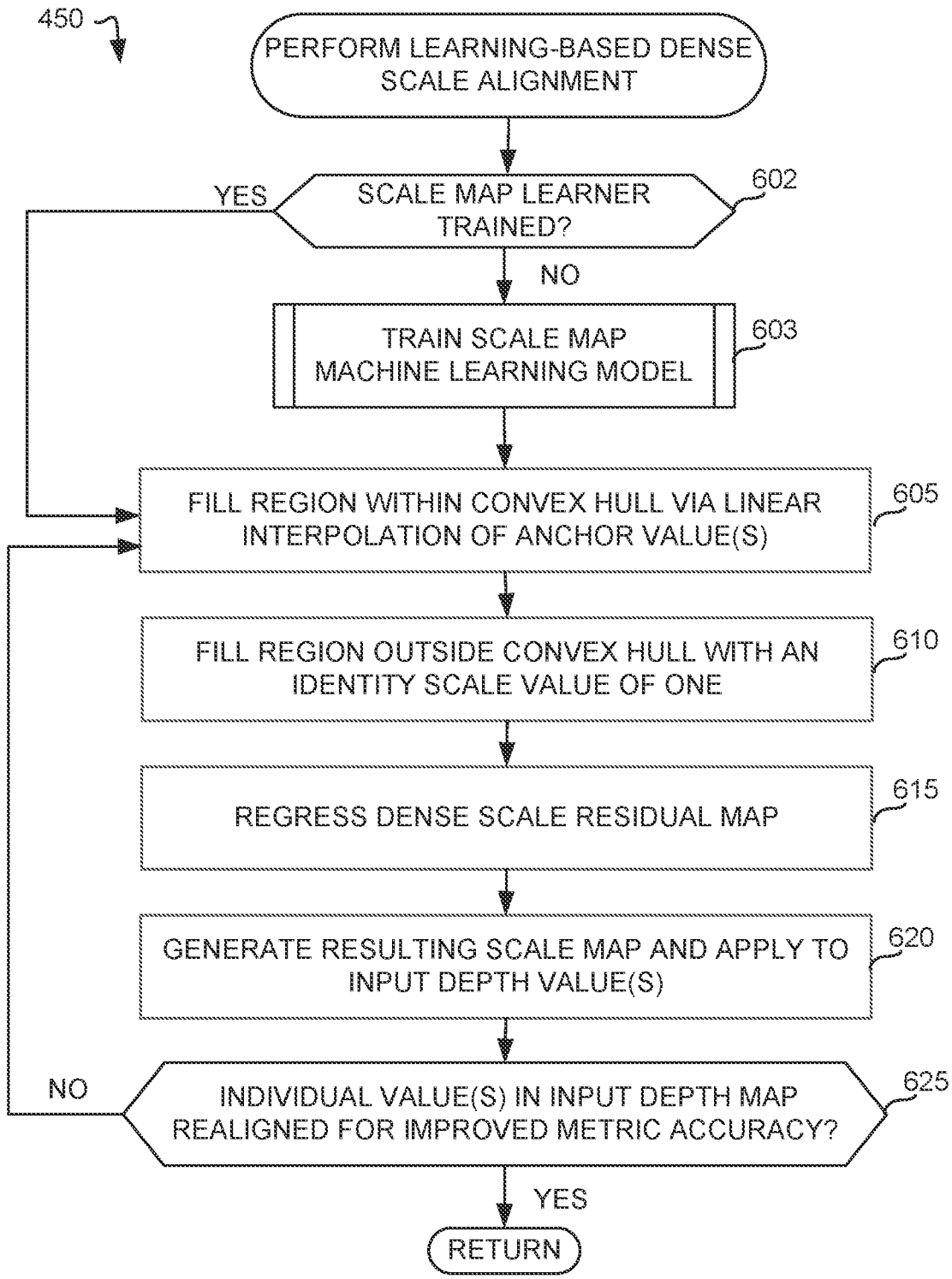
FIG. 6 is a flowchart representative of example machine readable instructions which may be executed to implement the example scale aligner circuitry of FIG. 1.

FIG. 6 is a flowchart representative of example machine readable instructions 450 which may be executed to implement the example scale aligner circuitry 150 of FIG. 1. In the example of FIG. 6, the scale aligner circuitry 150 determines whether scale map learned training is needed (block 602). For example, if the scale map machine learning model training is not initiated and/or not completed, control proceeds to the second computing system 350 to perform training of the scale map model 385 using the trainer 370, as described in connection with FIG. 7 (block 603). Once the training is complete, the scale map learner circuitry 315 can fill region(s) within a convex hull via linear interpolation of anchor value(s) (block 605) and/or fill region(s) outside a convex hull with an identify scale value of one (block 610). For example, the scale map learner circuitry 315 receives input(s) using the depth prediction input circuitry 305 and/or the scaffolding map input circuitry 310, where n locations of known sparse depth values v from VIO define n scale anchor points $v_i/\hat{z}_i$, $i \in \{1 \ldots n\}$, as described in more detail in connection with FIG. 2. As such, a region within the convex hull determined by the anchors is filled via linear interpolation of anchor values while the region outside the convex hull is filled with an identity scale value of one. The scale map learner circuitry 315 regresses the dense scale residual map 170 (block 615) and a resulting scale map can be generated and applied to the input depth value(s) (block 620), as described in connection with FIG. 1. In some examples, the scale map can be generated until individual value(s) in the input depth map are realigned for improved metric accuracy (block 625).

FIG. 7 is a flowchart representative of example machine readable instructions 603 which, when executed by a computing system of FIG. 3, cause the computing system to train a neural network to perform scale mapping. In the example of FIG. 7, the trainer 370 accesses training data 360 (block 705). The training data 360 can include a TartanAir dataset (e.g., a dataset used for robot navigation tasks, etc.) for access to a large size and variety of outdoor and indoor environment sequences and/or a VINS-Mono feature tracker to obtain sparse feature locations and/or sample ground truth depth at those locations. The trainer 370 identifies data features represented by the training data 360 (block 710). The training controller 365 instructs the trainer 370 to perform training of the neural network using the training data 360 to generate a scale map model 385 (block 715). In some examples, additional training is performed to refine the model 385 (block 720).

Figure 8A:
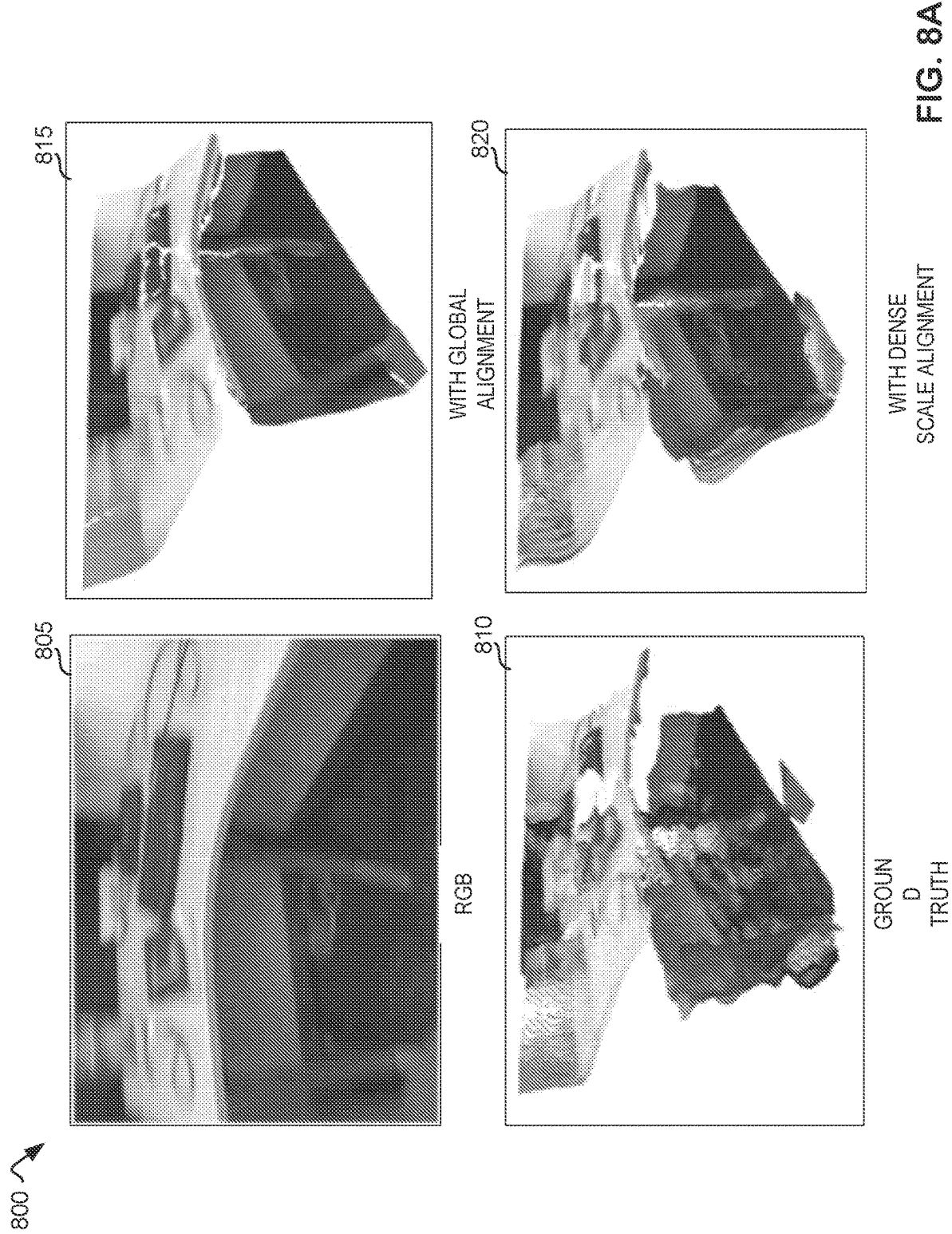
FIG. 8A illustrates example global and dense (local) alignment to resolve metric scale in affine-invariant monocular depth estimates.

FIG. 8A illustrates example global and dense (local) alignment 800 to resolve metric scale in affine-invariant monocular depth estimates. In the example of FIG. 8A, an original RGB input image 805 is shown, including a resulting global alignment image 815, a ground truth image 810, and dense scale alignment image 820. Global alignment determines appropriate global scale, while dense scale alignment operates more locally and pushes or pulls individual regions toward correct metric depth (e.g., desk objects are realigned more accurately, the center desk leg becomes straighter, and the desktop is pulled forward relative to the desk back panel). Using methods and apparatus disclosed herein, robust monocular depth estimation models trained on mixed datasets can be applied for recovering metric scale for individual depth estimates. For example, inertial data can be used in conjunction with monocular visual data to produce fully-dense, metrically accurate depth predictions, as shown in connection with FIG. 8A. As described herein, least-squares fitting of monocular depth estimates can be performed against metric sparse depth, followed by learned local per-pixel depth scaling. This combination of global and dense (local) depth alignment rectifies metric scale in depth estimates, with dense alignment consistently outperforming a global alignment baseline. As described in more detail in connection with FIGS. 10-17, alignment succeeds with just 150 sparse depth points, is robust to zero-shot cross-dataset transfer, and benefits from pretraining. For example, using Visual Odometry with Inertial and Depth (VOID), 42% and 48% lower inverse root mean squared error (iRMSE) is identified over state-of-the-art with zero-shot transfer and pretraining on TartanAir, respectively. As such, the visual-inertial depth estimation pipeline 100 adopts a modular structure that facilitates drag-and-drop monocular depth estimation models and/or VIO systems, thereby reinforcing deployability and allowing the pipeline 100 to improve with new advances in depth and VIO algorithms.

Figure 8B:
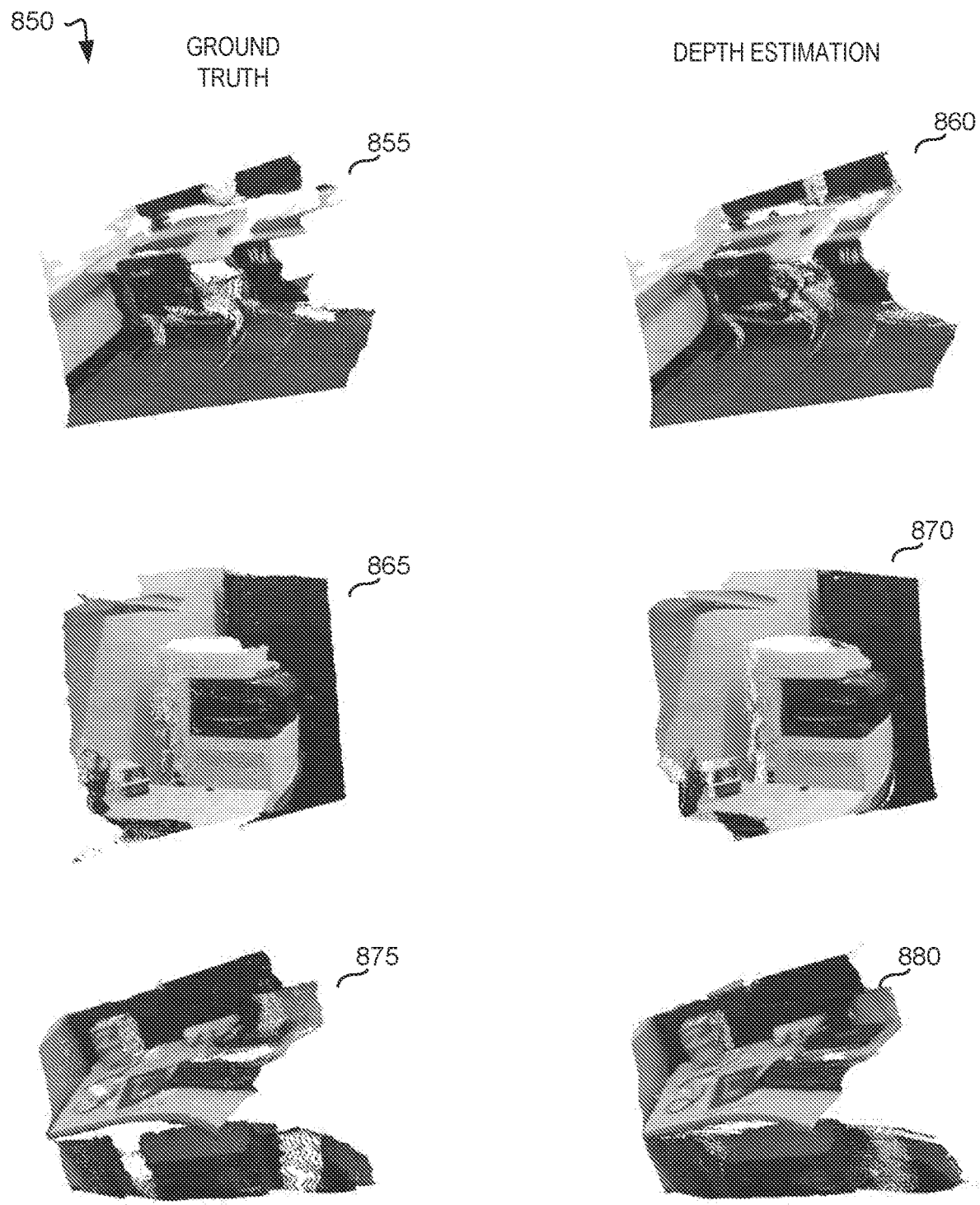
FIG. 8B illustrates example dense metric depth estimates that closely match ground truth, based on the methods and apparatus disclosed herein.

FIG. 8B illustrates example dense metric depth estimates 850 that closely match ground truth, based on the methods and apparatus disclosed herein. For example, using the visual-inertial depth estimation pipeline 100, dense metric depth estimates can be produced that, when backprojected to 3D space, closely match ground truth, as shown using example ground truth image(s) 855, 865, 875 and corresponding depth estimation image(s) 860, 870, 880.

FIG. 9 illustrates an example network architecture(s) 900, 932, and/or 965 used in conjunction with the visual-inertial depth estimation pipeline 100 of FIG. 1. For example, the ScaleMapLearner (SML) network 165 that performs dense scale alignment on globally aligned metric depth maps can be based on the MiDaS-small architecture (e.g., a mobile friendly version in the robust and generalizable MiDaS family of monocular depth estimation models). In the example of FIG. 9, the network architecture(s) include a first network architecture 900 for MiDaS-small, a second network architecture 932 that shows a FeatureFusion block structure 935 and a ResidualConvUnit 960 as part of the MiDaS-small network architecture, and a third network architecture 965 that illustrates the SML network 165 using the MiDaS-small architecture blocks. For example, the first network architecture 900 for MiDaS-small is designed for monocular depth estimation based on an input RGB image 905. An example encoder 910 incorporates an EfficientNet-Lite3 backbone, with skip connections propagating out features at four levels. An example decoder 915 includes four FeatureFusion blocks that progressively upsample and merge features from the encoder 910 and the skip connections. An example output convolution block 920 can include Rectified Linear Units (RELUs) for generating an example final depth map 930. The second network architecture 932 includes diagrams of the FeatureFusion block structure 935 and the ResidualConvUnit 940. These blocks are parametrized by the number of input (IF) and output (OF) features. In the example of the third network architecture 965, the ScaleMapLearner (SML) network 165 uses the MiDaS-small architecture blocks shown in connection with the first network architecture 900 and the second network architecture 932. For example, the encoder 910 receives the globally-aligned depth map 155 and/or the scale map scaffolding 160. Whereas MiDaS-small outputs affine-invariant depth maps, the SML network 165 outputs metrically accurate depth maps (e.g., output depth map 175). By default, the SML network 165 regresses scale residuals with a single OutputConv head 920. For ablation experiments where regression of dense shift is performed in addition to scale residuals, a second identical OutputConv head 922 can be used in parallel, and the encoder 910 and feature fusion blocks remain common to both regression tasks.

Figure 10:
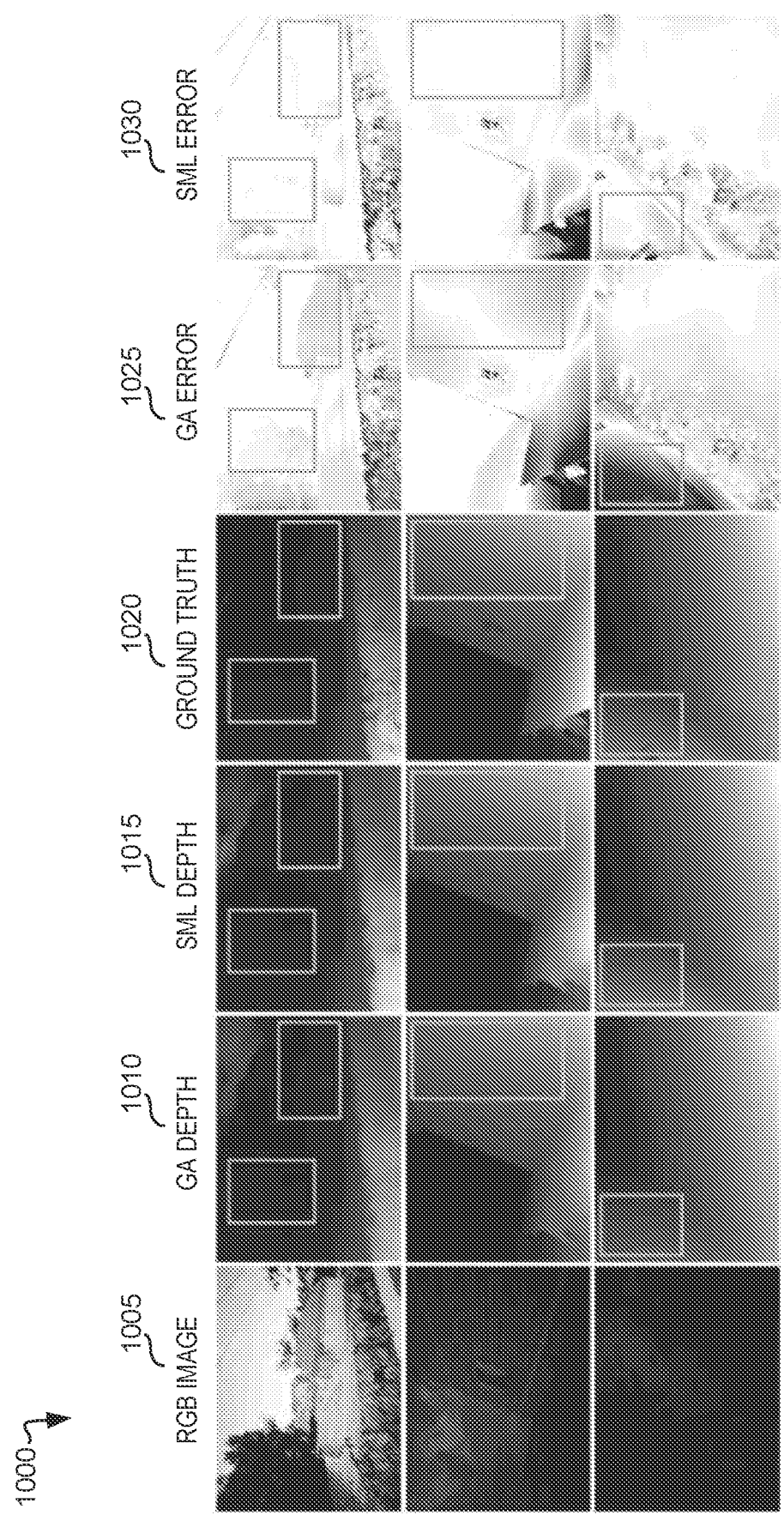
FIG. 10 illustrates example visualization of results associated with TartanAir samples evaluated using the visual-inertial depth estimation pipeline of FIG. 1.

FIG. 10 illustrates example visualization of results 1000 associated with TartanAir samples evaluated using the visual-inertial depth estimation pipeline 100 of FIG. 1. In the example of FIG. 10, TartanAir data can be preprocessed with a sparsifier that samples depth from the ground truth at locations determined via a feature tracker. In some examples, global alignment generator circuitry 120 can perform monocular depth estimation using DPT-Hybrid, followed by global alignment against metric sparse depth, and generation of a scale map scaffolding (e.g., dense scale map scaffolding 160) for every sample prior to SML network 165 training. When the baseline is redefined as global alignment only, performing dense scale alignment with the SML network 165 improves metric depth accuracy. In the example of FIG. 10, assessment can be performed using an RGB image 1005 (e.g., at varying light conditions), a globally aligned (GA) depth 1010, a SML network depth 1015, ground truth 1020, GA error 1025, and/or SML error 1030. For example, performance is qualitatively evaluated by comparing metric depth error maps computed for globally aligned depth (GA error 1025) to those computed for densely scaled depth (SML error 1030). In depth maps, brighter is closer and darker is farther. In error maps, positive inverse depth error is farther than ground truth and negative inverse depth error is closer than ground truth. Dense scale alignment with the SML network 165 improves metric depth accuracy over global alignment alone, as seen by the whiter regions in the error maps. The bottom two samples are particularly challenging cases due to low light conditions. For example, a whiter region in the error map indicates that the SML network 165 improved metric depth accuracy in that region. The first sample depicts a neighborhood scene where the building towards center-right is pushed further back under dense scale alignment, as confirmed by a reduction in negative error in inverse depth. A tree shown in the RGB image 1005 behind the pool is brought closer, as shown by the reduction in positive error. The latter two samples depict significantly more challenging scenes due to low light as well as proximity to walls and the ground. In both, the SML network 165 still realigns surfaces towards correct metric depth.

FIG. 11 illustrates example tabulated data 1100, 1150 associated with the evaluation of TartanAir and/or visual odometry with inertial and depth (VOID) samples in connection with FIG. 10. In the example of FIG. 10, DPT-Hybrid can be trained on a large mixed dataset containing TartanAir. To remove any potential bias this contributes to SML network 165 performance on TartanAir, a weaker MiDaS v2.0 model that has not seen any TartanAir data during training can be included. For example, MiDaS v2.0 results in the same trends as DPT-Hybrid, with the SML network 165 achieving consistent improvement across all metrics. For example, the tabulated data 1100 includes a method 1105 used for evaluation (e.g., global alignment (GA) only, GA in combination with the SML network 165), a depth model 1110 (e.g., DPT-Hybrid, MiDaS v2.0 model), an inverse mean absolute error (iMAE) 1115, an inverse root mean squared error (iRMSE) 1120, and an inverse absolute relative error (iAbsRel) 1125. For example, the SML network 165 achieves 30%, 17%, and 26% reduction in iMAE, iRMSE, and iAbsRel, respectively. In the example of FIG. 11, metrics are aggregated across a set of 690 samples taken from the TartanAir test split. As such, the dense scale alignment with SML network (GA+SML) consistently outperforms the global alignment (GA) baseline.

Similarly, the tabulated data 1150 includes the method 1105, an example training set 1155, an example mean absolute error (MAE) 1160, an example root mean squared error (RMSE) 1165, the iMAE 1115, the iRMSE 1120, and the iAbsRel 1125. In the example of the tabulated data 1150, the VOID dataset is preprocessed in the same fashion as the TartanAir data but using varying sparse depth. For example, SML improves over the global alignment baseline across all metrics, with a 38%, 30%, and 39%, reduction in iMAE, iRMSE, and iAbsRel, respectively. In the example of tabulated data 1150, zero-shot testing performs just as well as training directly on VOID, with pretraining on TartanAir (TA) prior to training on VOID showing the best results. In the example of tabulated data 1150, all methods use DPT-Hybrid as the depth model with a total of 150 sparse depth points.

In examples disclosed herein, the SML network 165 can be trained on TartanAir and evaluated on VOID without any finetuning (i.e., zero-shot cross-dataset transfer). This can be interpreted as a sim-to-real transfer experiment, since TartanAir consists solely of synthetic data and VOID contains real-world data samples. In some examples, zero-shot testing on VOID achieves very similar error as when training directly on VOID. If evaluating in inverse depth space, zero-shot transfer even slightly outperforms direct training on VOID, demonstrating that training on a large quantity of diverse synthetic data can indeed translate to improved real-world performance. DPT-Hybrid is already known to generalize well after having been trained on a massive mixed dataset with scale- and shift-invariant loss functions. As disclosed herein, the SML network 165 is trained using metric loss terms. However, some metric information is provided to SML network 165 via the globally aligned depth and scale map scaffolding inputs. Since the SML network 165 only needs to learn to refine this scaffolding, the SML network 165 is less likely to memorize and/or overfit to a specific metric scale.

Figure 12A:
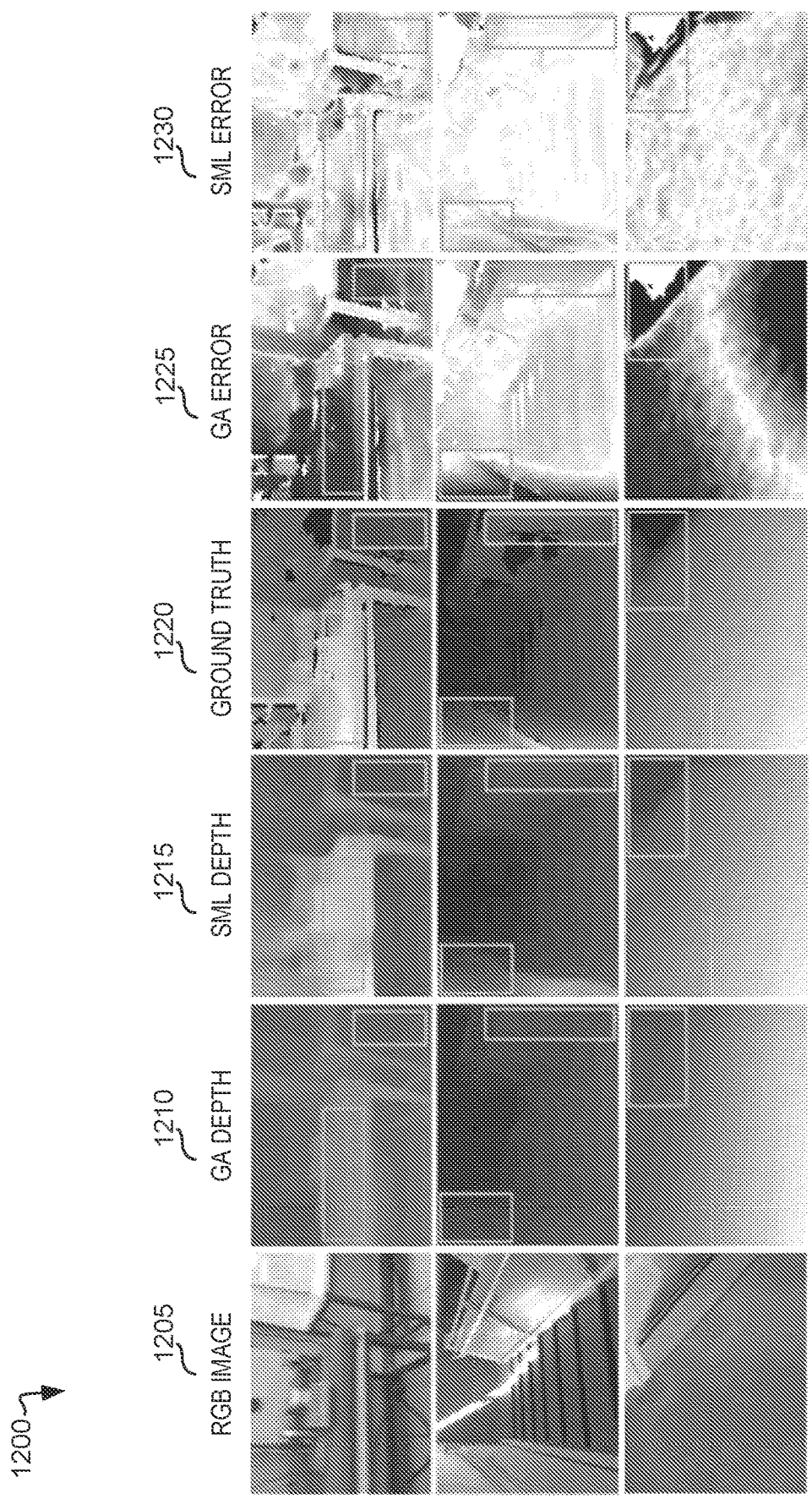
FIG. 12A illustrates example visualization of results associated with using Visual Odometry with Inertial and Depth (VOID) dataset samples evaluated using the visual-inertial depth estimation pipeline of FIG. 1.

FIG. 12A illustrates example visualization of results 1200 associated with using Visual Odometry with Inertial and Depth (VOID) dataset samples evaluated using the visual-inertial depth estimation pipeline 100 of FIG. 1. Pretraining on TartanAir, followed by training on VOID, yields the lowest error across all metrics, as shown in connection with FIG. 11. Such a training combination can be used to produce the results visualized for three VOID samples (e.g., RGB image(s) 1205) in the example of FIG. 12A. For example, the results include initial RGB image(s) 1205, global alignment (GA) depth image(s) 1210, SML depth image(s) 1215, ground truth image(s) 1220, global alignment (GA) image(s) 1225, and SML error image(s) 1230. The first sample suffers from blurriness in the RGB input and depicts a cluttered scene. With global alignment only, depth predictions appear flattened (e.g., the table is aligned to be farther than ground truth, while background surfaces such as walls and the floor are aligned to be closer than ground truth). Dense scale alignment with SML helps to rectify this, with noticeable reduction (e.g., whiter regions) throughout the error map. The second RGB image 1205 sample shows a staircase. In addition to reducing depth error on the steps, the SML network 165 correctly realigns the handrail on the left. Given that pixels near image bounds fall outside the convex hull of known sparse depth points, and the scale map scaffolding input to the SML network 165 signals no information at pixels outside the convex hull, this result shows that the SML network 165 can regress dense scales correctly for these pixels as well. The last sample of the RGB image 1205 shows a challenging viewpoint that mostly sees the floor leading to a staircase in the top right corner. With global alignment only, the depth prediction misjudges the depth gradient at the staircase edge. The SML network 165 corrects this and also reduces depth error elsewhere on the floor surface.

FIG. 12B illustrates example tabulated data 1250 associated with the evaluation of VOID samples in connection with FIG. 12A. For example, a comparison can be made against related works that also benchmark on VOID (e.g., method(s) 1255), including results for mean absolute error (MAE) 1260, root mean squared error (RMSE) 1265, inverse mean absolute error (iMAE) 1270 and inverse root mean squared error (iRMSE) 1275. In the example of FIG. 12B, VOICED and KBNet methods can be compared alongside the visual-inertial depth estimation pipeline 100 (e.g., global alignment (GA)+SLM). Two example VOICED methods correspond to whether a pose used is obtained via PoseNet (-P) or via SLAM (-S). For example, leveraging pose from a visual-inertial SLAM system instead of a pose network leads to improved metrics. In the example of FIG. 12B, all three density settings available in the VOID dataset are evaluated with the SML network 165 retained for each, while KBNet serves as a state-of-the-art baseline. For example, the GA+SML combination outperforms the state-of-the-art KBNet at lower densities.

In addition to using DPT-Hybrid as the depth estimator, DPT-Large can be used for higher depth estimation accuracy while MiDaS-small can be used for computational efficiency. At the lowest density of 150 sparse points, the GA+SML method outperforms the state-of-the-art KBNet across all metrics, regardless of the depth estimator. For example, even zero-shot transfer outperforms KBNet by 42% in iRMSE, while pretraining on TartanAir further boosts that improvement to 48%. At a medium density of 500 points, the GA+SML method remains highly competitive when using DPT-Large or DPT-Hybrid, with KBNet outperformed across most metrics. While at a highest density of 1500 points the GA+SML method is less competitive, in comparison to DPT-Large the GA+SML method still achieves the second-best result. However, this setting is less desirable in practice, since tracking such a large number of features via visual odometry can become computationally prohibitive in a mobile setting. Consequently, greater emphasis can be placed on network performance at lower densities.

Figure 13:
FIG. 13 illustrates example tabulated data associated with input and regressed modalities in ScaleMapLearner (SML) on TartanAir and with zero-shot testing on VOID.

FIG. 13 illustrates example tabulated data 1300 associated with input and regressed modalities in ScaleMapLearner (SML) on TartanAir and with zero-shot testing on VOID. For example, a number of input and regressed data modalities can be tested when designing the SML network 165. As previously described, the SML network 165 receives two input channels (e.g., globally aligned inverse depth $\tilde{z}$ and a scale map scaffolding). However, four additional inputs can be tested: (1) a confidence map derived from a binary map pinpointing known sparse depth locations (e.g., first dilated with a 7×7 circular kernel and then blurred with a 5×5 Gaussian kernel to mimic confidence spread around a fixed known point), (2) a gradient map (e.g., computed using the Scharr operator), (3) a grayscale conversion of the original RGB image, and (4) the RGB image. Inputs are concatenated in the channel dimension and fed into the SML network 165 as a single tensor. Tabulated data 1300 shows the impact of different input combinations on the metric accuracy of depth output by the SML network 165 after retraining. In the example of FIG. 13, the results include input modality combination(s) 1305, regressing scale shift indication 1310, TartanAir-based results 1315, and VOID-based results 1320.

For example, globally aligned depth alone is not sufficient for the SML network 165 to learn dense scale regression well. An input scale map scaffolding is necessary. Conceptually, this acts as an initial guess at the dense scale map that the network is learning to regress. Without an accompanying scale map in-put, the confidence map negligibly improves SML learning. However, using both of these modalities slightly underperforms compared to using just input scale scaffolding. This is surprising, as the confidence map is meant to signal which regions in the input depth and scale scaffolding are more trustworthy. In some examples, a representation of confidence is not being parsed well or the scale map scaffolding encodes similar information (e.g., boundaries of the convex hull and approximate positions of interpolation anchors corresponding to known sparse metric depth). In some examples, incorporating edge representations in the form of gradient maps, grayscale, and/or RGB images may not be beneficial. This can be partly attributed to the high quality of depth predictions output by DPT-Hybrid, as those depth maps already exhibit clear edges and surfaces. For example, RGB input can worsen performance, implying that color cues are not very useful in the dense metric scale regression task. As such, the results on TartanAir (e.g., TartanAir-based results 1315) suggest that an input modality combination of depth and scale scaffolding functions best. Since cross-dataset transfer is of importance, zero-shot performance of every input combination on VOID is also evaluated (e.g., VOID-based results 1320). Consequently, combined depth and scale scaffolding result in noticeably lower error than all other input combinations. Since image semantics and sparsity patterns vary between TartanAir (synthetic) and VOID (real), which limits how well SML training on TartanAir confidence and image-derived modalities can translate to testing on VOID, depth and scale scaffolding can be selected as the only inputs to SML, as shown in the example visual-inertial depth estimation pipeline 100.

As previously described, the SML network 165 learns per-pixel scale factors by which to multiply input depth estimates $\tilde{z}$, such that the output depth $\hat{z}$ achieves higher metric accuracy. The SML network 165 can be allowed to regress negative values as scale residuals r, such that the output depth is $\hat{z}=\text{ReLU}(1+r)\tilde{z}$. The design choice to regress scale can be motivated by scale factors having a more intuitive interpretation in projective geometry. For example, scaling a depth value at a pixel location can be interpreted as zooming in (e.g., pulling closer) or zooming out (e.g., pushing further) the object at that location in 3D space. In some examples, it is more difficult to anticipate the impact of shifting depth at individual pixels. In some examples, only dense shift t can be regressed, such that the output prediction can be represented as $\hat{z}=\tilde{z}+t$. In some examples, shift t can be regressed in conjunction with scale residuals r, where $\hat{z}=\text{ReLU}(1+r)\tilde{z}+t$. For the latter, a second output head can be added to the SML network 165 architecture, while the encoder and decoder layers remain common to both regression tasks, as shown in the example of FIG. 9. When training with shift regression, a default learning rate of $5\times10^{-4}$ prohibits loss convergence and necessitates a slightly lower one of a default learning rate of $4\times10^{-4}$. Overall, regressing shift does not significantly impact SML network 165 performance on TartanAir, while zero-shot testing on VOID indicates that regressing scales only is most robust for cross-dataset transfer.

Figure 14:
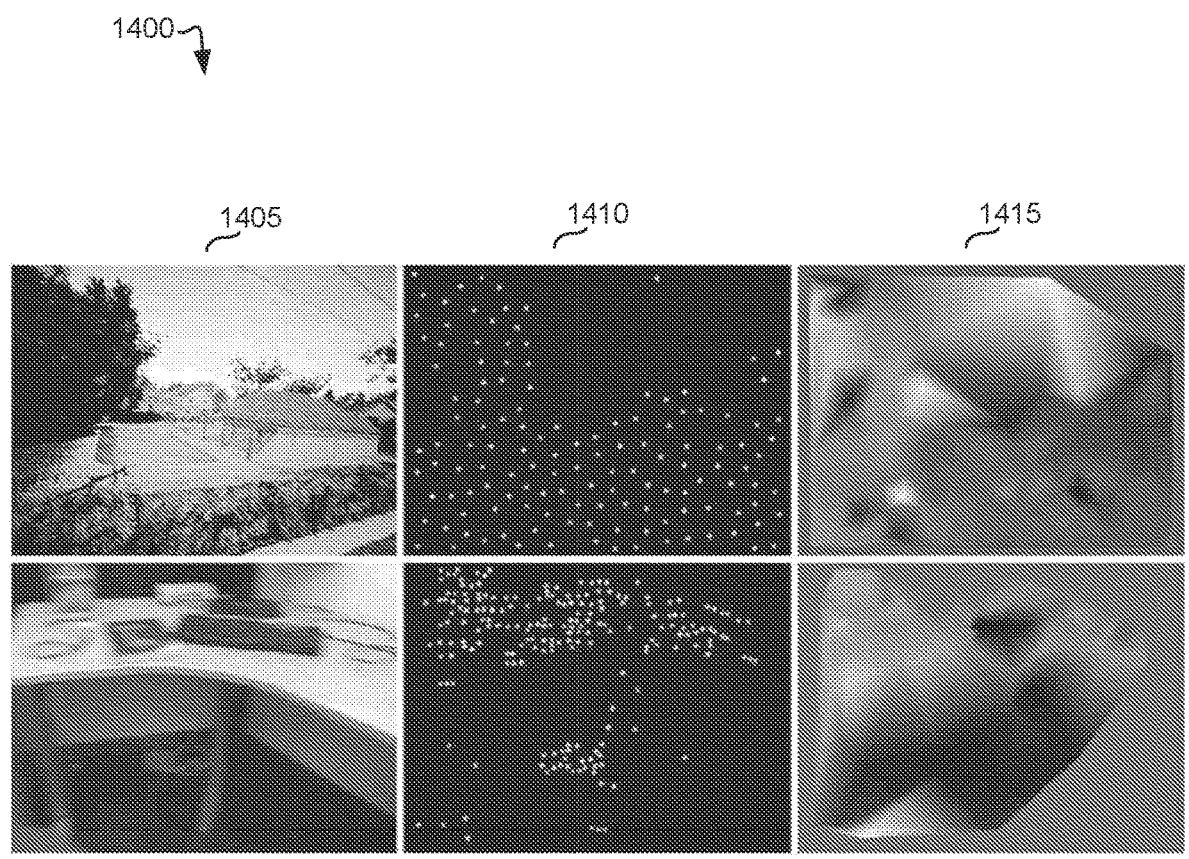
FIG. 14 illustrates example differences in sparsity patterns and coverage between TartanAir samples and VOID samples.

FIG. 14 illustrates example differences 1400 in sparsity patterns and coverage between TartanAir samples and VOID samples. In the example of FIG. 14, TartanAir samples are shown in the upper row and VOID samples are shown in the bottom row, including example RGB image(s) 1405, example sparse points 1410, and example interpolated scale map scaffolding 1415. For example, to synthetically generate metric sparse depth for TartanAir, a sparsifier can be used that samples ground truth at locations determined via feature tracking. In some examples, low densities of sparse points can be targeted (e.g., namely up to 150 points, which is in line with the quantity that would be tracked by the frontend of VINS-Mono). Although it is possible to track higher densities, doing so would require more computation and would be less appropriate for real-time applications. The feature tracker used with TartanAir can enforce a minimum distance between landmarks, which leads to high coverage in the sparsity map given a sufficiently textured scene. In contrast, the sparse points provided in the VOID dataset tend to be more clustered, as shown in the example of FIG. 14. For example, clustering leads to regions of smoother interpolation within the convex hull of the scale map scaffolding. This makes learning dense scale easier and improves metric depth prediction. For example, experiments with the SML network 165 indicate a 39% reduction in iAbsRel on VOID versus a 26% reduction in iAbsRel on TartanAir. Given these differences in sparsity patterns and coverage, successful zero-shot transfer from TartanAir to VOID highlights the robustness of the scale map learning approach.

In some examples, integration of the GA-SML method into a real-world system can rely on successful visual-inertial odometry to produce sparse depth. In cases of rapid motion, poor lightning, and/or lack of sufficient texture, visual-inertial odometry can have difficulty tracking landmarks and/or output very few or even no points. Fewer sparse depth points can result in less reliable estimates for global scale and shift, and without any points, global alignment can be difficult to perform. In some examples, for scale map scaffolding, at least three non-colinear points can be needed so that interpolation does not occur over a convex hull that is a point or line. Whenever fewer sparse depth points are provided, the resulting scale map scaffolding becomes an identity map and loses meaning. This hinders how well the SML network 165 can regress dense scales. Given that motion and depth estimation can be alternated to boost accuracy, exploring conditions under which odometry-guided metric depth alignment can help recovery from odometry failure can be useful in improving the network's performance.

Figure 15A:
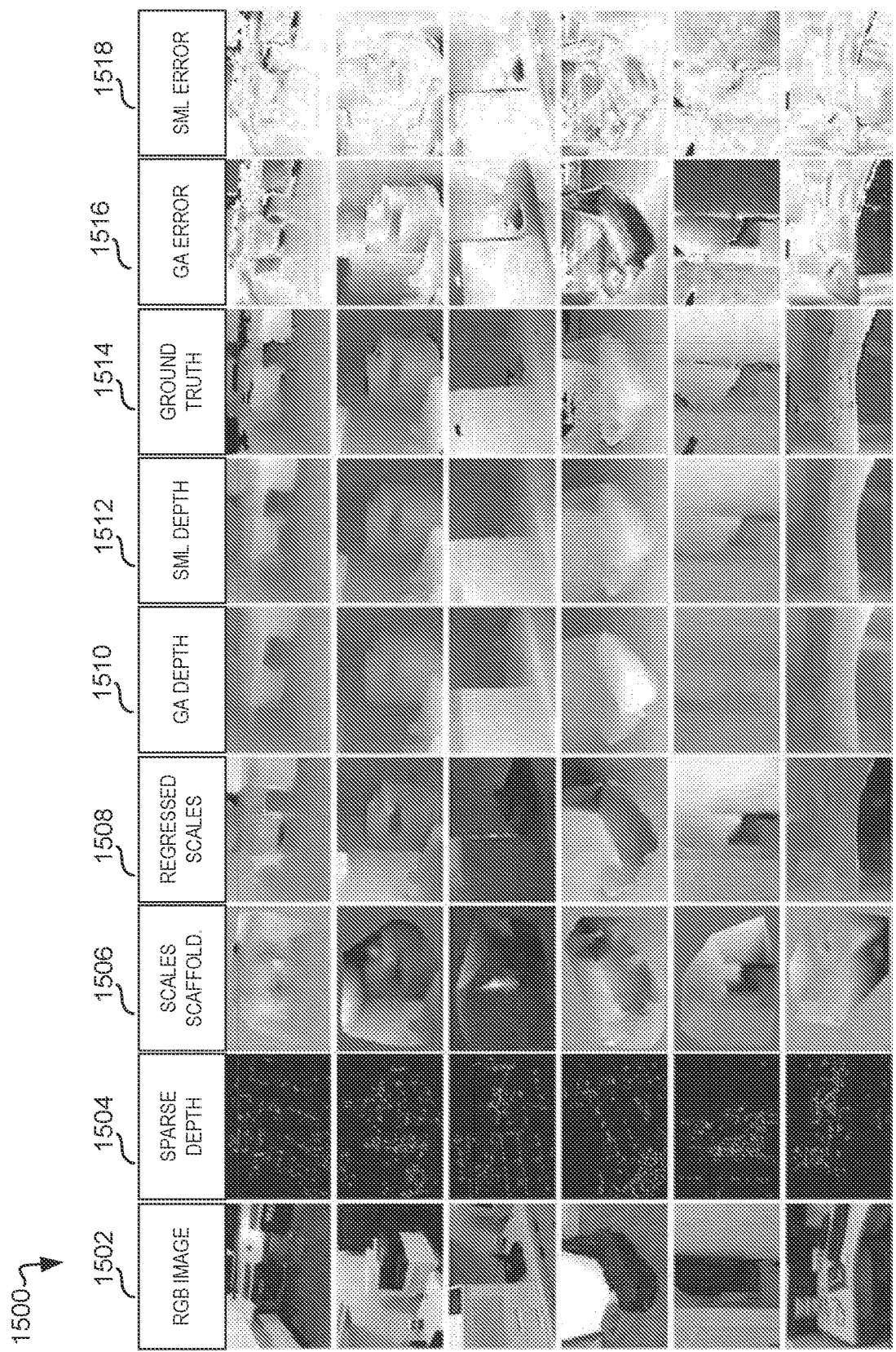
FIG. 15A illustrates an example first set of visualizations for additional results associated with the VOID test set, including depth and error maps, and confidence maps pinpointing known sparse metric depth locations.
Figure 15B:
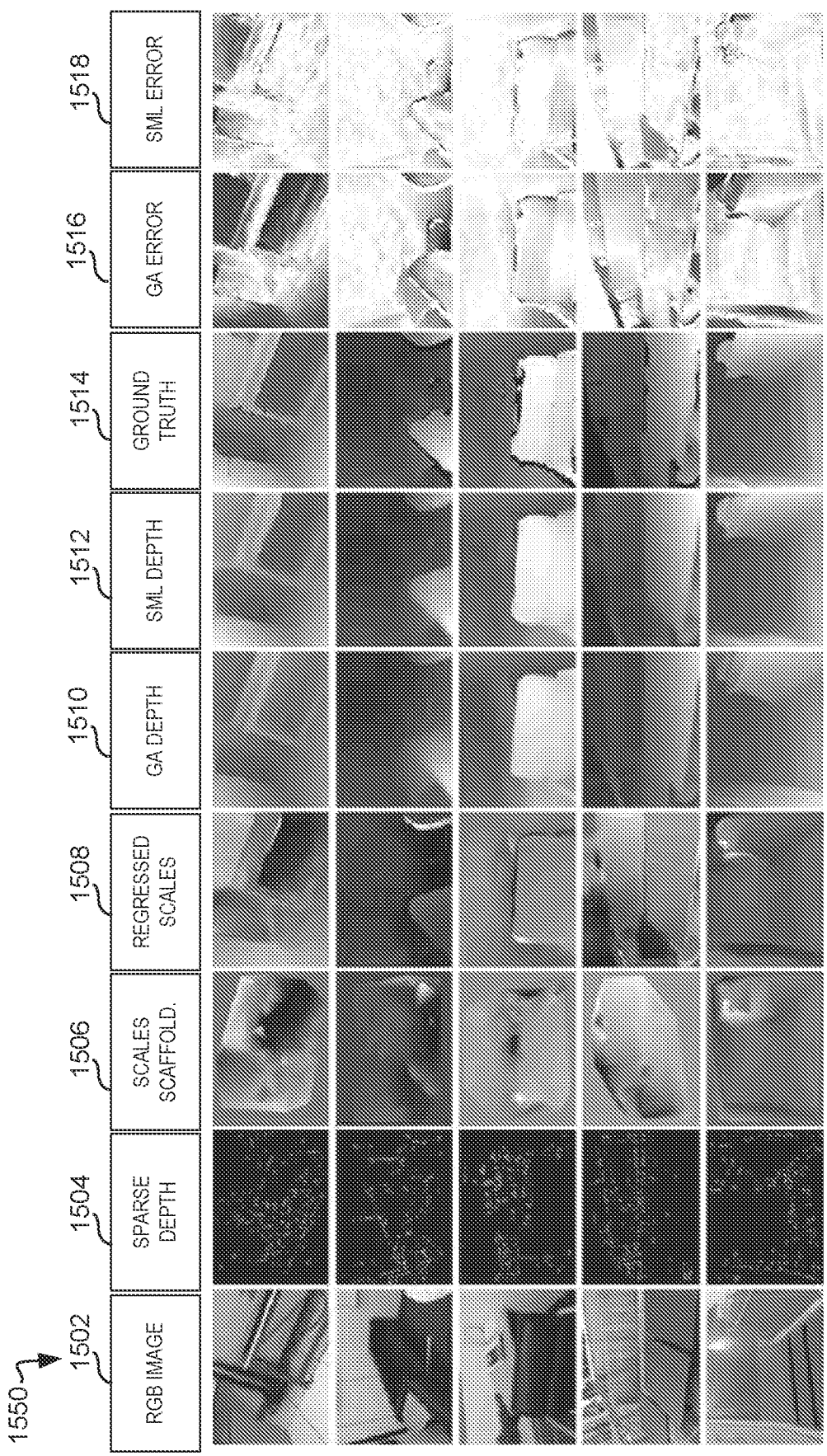
FIG. 15B illustrates an example second set of visualizations for additional results associated with the VOID test set, including depth and error maps, and confidence maps pinpointing known sparse metric depth locations.
Figure 15C:
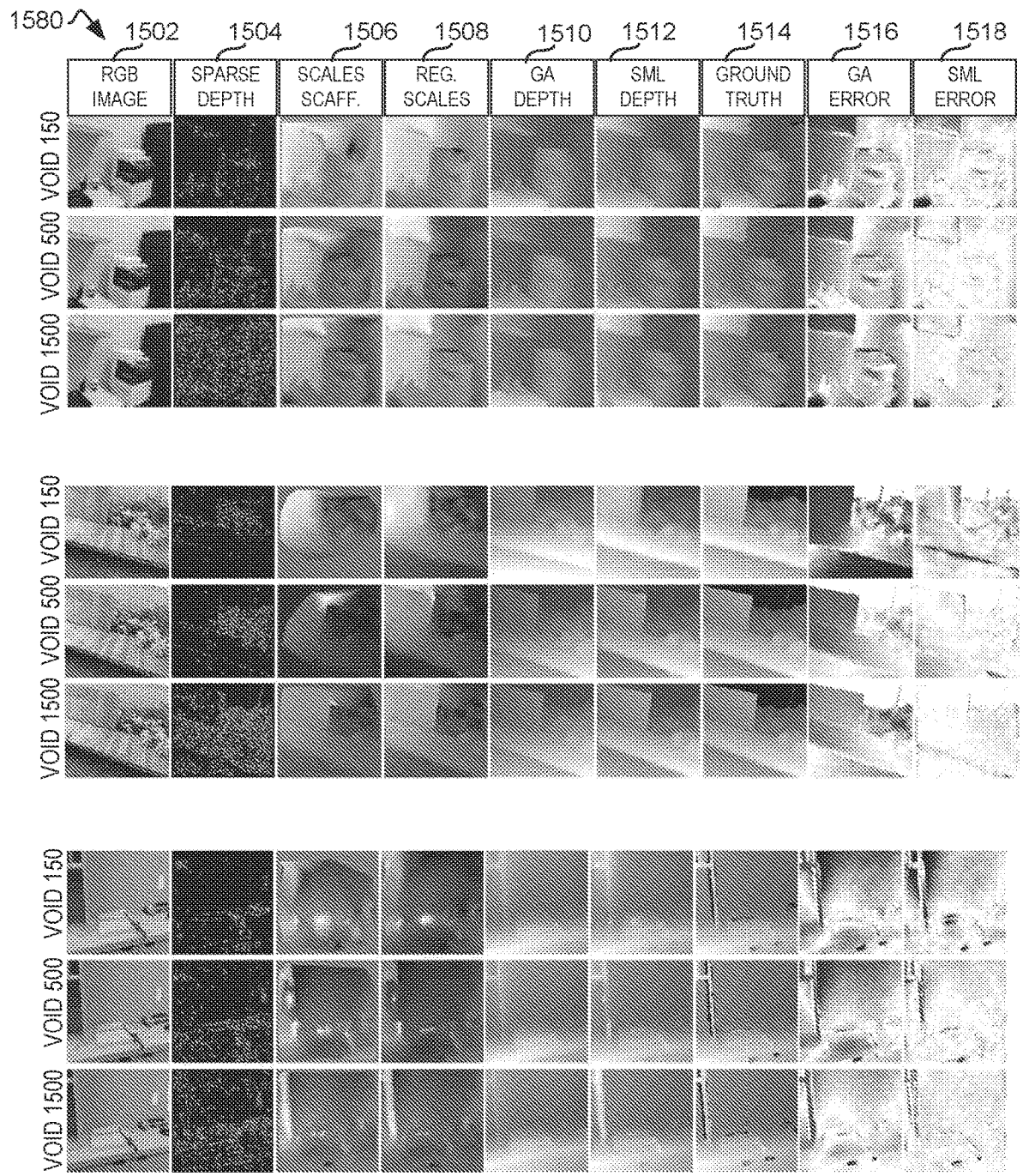
FIG. 15C illustrates an example third set of visualizations for additional results associated with the VOID test set, including depth and error maps, and confidence maps pinpointing known sparse metric depth locations.

FIG. 15A illustrates an example first set of visualizations 1500 for additional results associated with the VOID test set, including depth and error maps, and confidence maps pinpointing known sparse metric depth locations. FIG. 15B illustrates an example second set of visualizations 1550 for additional results associated with the VOID test set, including depth and error maps, and confidence maps pinpointing known sparse metric depth locations. FIG. 15C illustrates an example third set of visualizations 1580 for additional results associated with the VOID test set, including depth and error maps, and confidence maps pinpointing known sparse metric depth locations. In the example of FIGS. 15A, 15B, and/or 15C, the results shown include RGB image(s) 1502, sparse depth image(s) 1504, scale scaffolding image (s) 1506, regressed scale image(s) 1508, global alignment (GA) depth image(s) 1510, SML depth image(s) 1512, ground truth image(s) 1514, global alignment (GA) error image(s) 1516, and/or SML error image(s) 1518. In addition to depth and error maps, confidence maps can be visualized for pinpointing known sparse metric depth locations, as well as the scale map scaffolding input to SML and the scale map regressed by SML. In depth maps, brighter is closer and darker is farther. In error maps, positive inverse depth error represents being farther than ground truth and negative inverse depth error represents being closer than ground truth. Additionally, whiter regions in error maps indicate a reduction in metric depth error. The model used to generate the results of FIGS. 15A, 15B, and/or 15C was first pretrained on TartanAir and then trained on VOID, assuming a DPT-Hybrid depth estimator. When comparing against related works that also benchmark on VOID, experiments can be performed at all three densities available in the dataset: 150, 500, and 1500 sparse metric depth points. FIG. 15C visualizes what sparsity at different densities looks like, along with how this impacts scale map scaffolding and regression with SML. In general, a larger number of sparse depth points results in better global alignment of depth (e.g., as indicated by whiter regions in the GA error maps) as well as more fine-grained scale map scaffolding. The SML network 165 performs better with the medium density of 500 relative to the low density of 150. For example, the SML error maps look whiter and lighter for VOID with 500 samples compared to VOID with 150 samples. However, a high density of 1500 sparse points results in diminishing returns. The scale map scaffolding already contains significant detail and consequently, there is less for the SML to learn to refine. The regressed scale maps in this case look very similar to the input scaffolding, indicating that high densities of sparse depth are not required for attaining favorable results.

FIG. 16 illustrates example tabulated data 1600 associated with performance of the visual-inertial depth estimation pipeline 100 disclosed herein at low densities of sparse metric depth points. For example, the VOID-150 dataset can be preprocessed using a VINS-Mono frontend re-implementation (e.g., the same sparsifier that is used on TartanAir data in ablation and pretraining experiments). The VINS-Mono feature tracker ensures a minimum distance between tracked features, resulting in lower clustering and higher coverage of projected sparse points across the image area. FIG. 16 includes example method(s) 1602, example sparsifier(s) 1604, example density identifier 1606, example average number of sparse points per sample (avg PPS) 1608, example mean absolute error (MAE) 1610, example root mean squared error (RMSE) 1612, example inverse mean absolute error (iMAE) 1614, example inverse root mean squared error (iRMSE) 1616, and example absolute relative error (iAbsRel) 1618. In the example of FIG. 16, two experiments with VINS-Mono on VOID are shown, including (1) tracking up to 150 features (0.05% density at VGA resolution) and (2) tracking up to 50 features (0.02% density). In the example of FIG. 16, the resulting average number of sparse points per sample (avg PPS) 1608 is shown aggregated over the full dataset. For fair comparison against related works, all SML models evaluated are trained directly on VOID without any pretraining on TartanAir. Global alignment (GA) performs similarly at low densities. Dense alignment with SML continues to improve metric depth accuracy over GA even at the very low density of 50, as indicated by the error reduction percentages.

Figure 17:
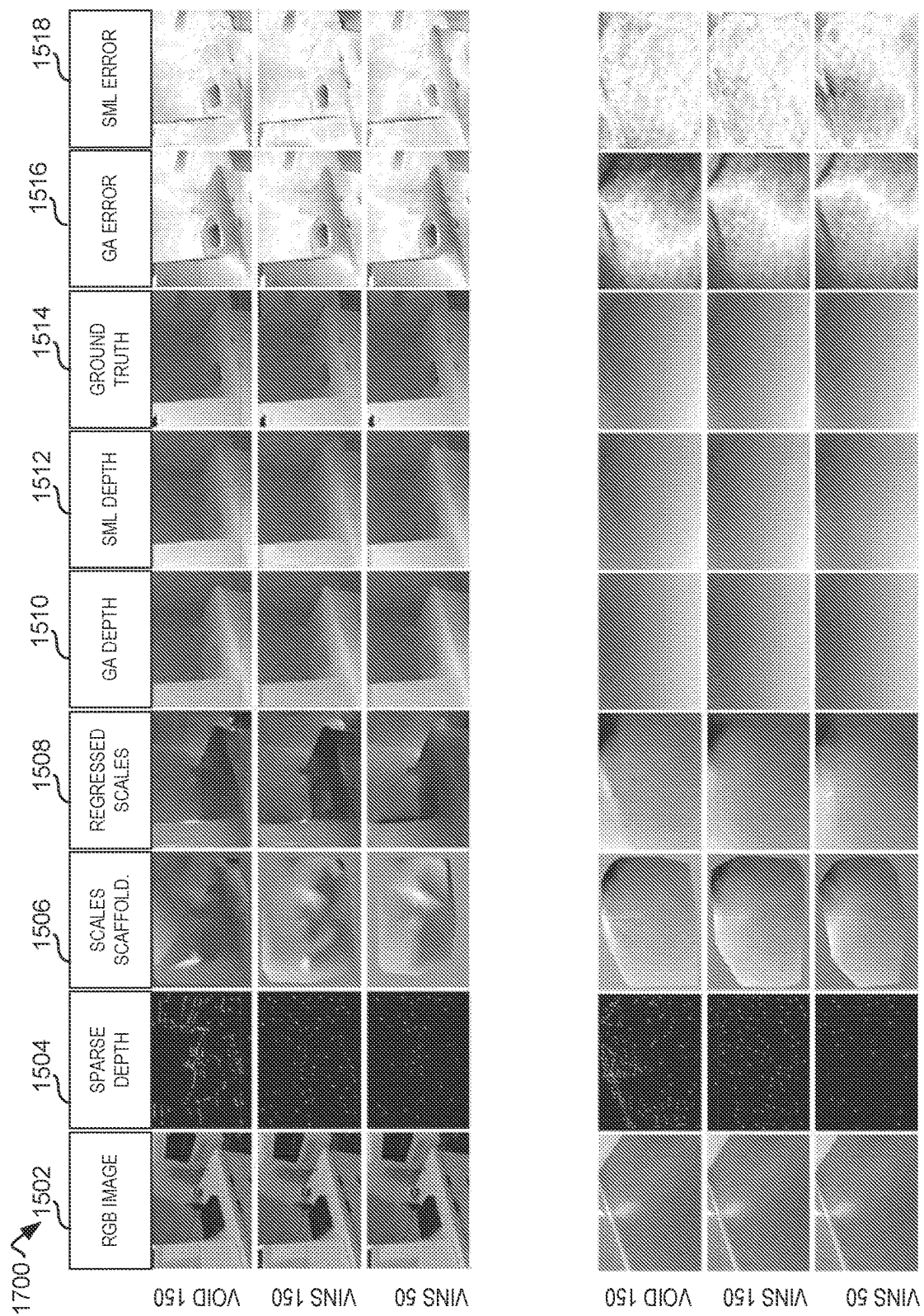
FIG. 17 illustrates examples results associated with the VOID dataset in connection with the tabulated data of FIG. 16.

FIG. 17 illustrates examples results 1700 associated with the VOID dataset in connection with the tabulated data of FIG. 16. In the example of FIG. 17, the results shown include RGB image(s) 1502, sparse depth image(s) 1504, scale scaffolding image(s) 1506, regressed scale image(s) 1508, global alignment (GA) depth image(s) 1510, SML depth image(s) 1512, ground truth image(s) 1514, global alignment (GA) error image(s) 1516, and/or SML error image(s) 1518. Sparse depth obtained using VINS-Mono is more spread out. This, together with constraining to a lower density of 50 points, leads to inferior scale map scaffolding. It becomes harder for SML to perform dense scale regression in regions originally devoid of sparse metric depth information, as seen with the VINS 50 samples. However, metric depth error is still reduced at very low densities of sparse points.

Figure 18:
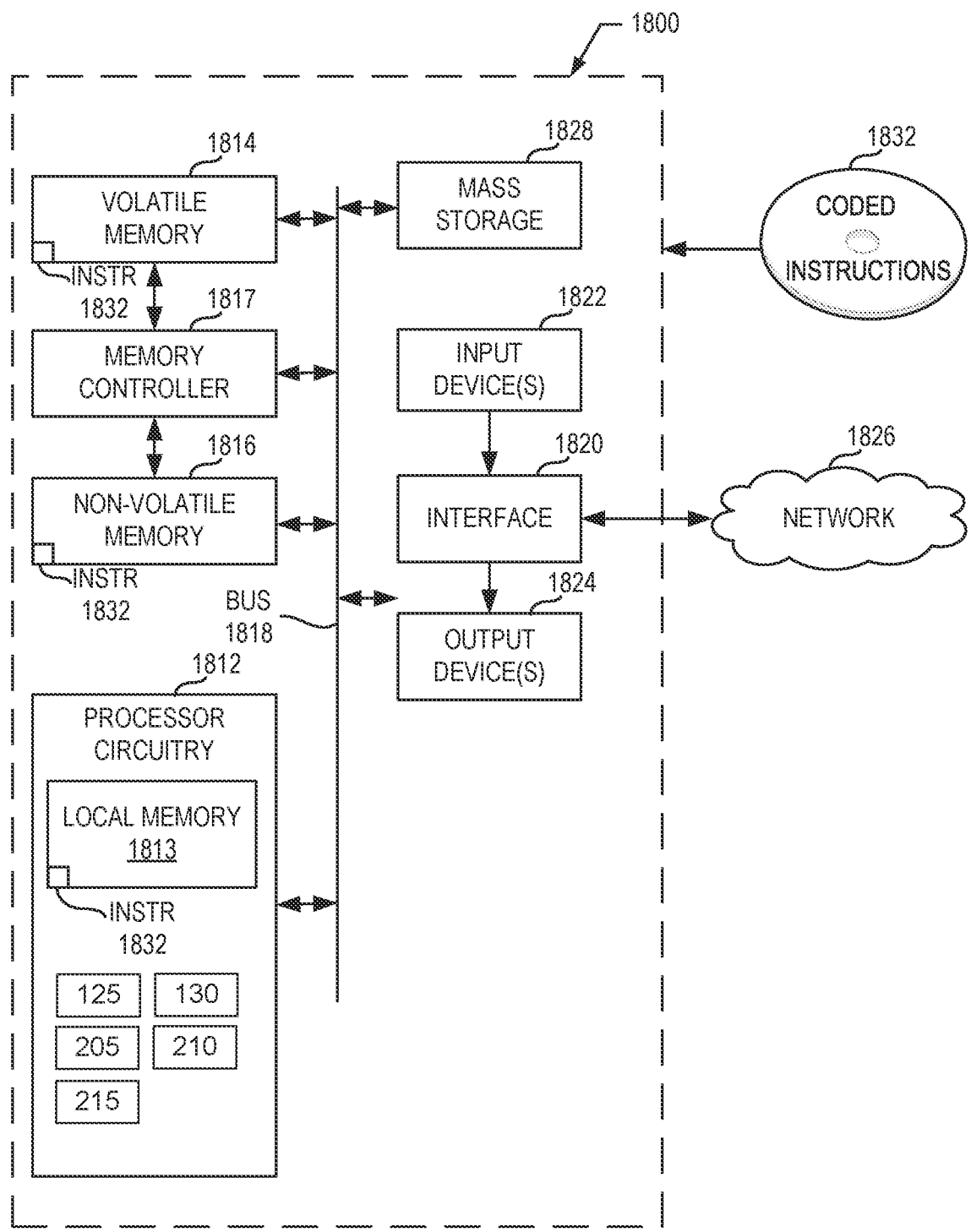
FIG. 18 is a block diagram of an example processing platform including processor circuitry structured to execute the example machine readable instructions of FIG. 4 to implement the example global alignment generator circuitry of FIG. 2.

FIG. 18 is a block diagram of an example processing platform structured to execute the instructions of FIG. 2 to implement the example global alignment generator circuitry 120 of FIGS. 1. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example monocular depth estimator circuitry 125, visual-inertial odometry sensor circuitry 130, depth estimate retriever circuitry 205, least-squares aligner circuitry 210, and/or global scale/global shift generator circuitry 215.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1880 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives.

The machine executable instructions 400 of FIG. 4 may be stored in the mass storage device 1828, in the volatile memory 1814, in the non-volatile memory 1816, and/or on a removable non-transitory computer readable storage medium such as a CD or DVD.

Figure 19:
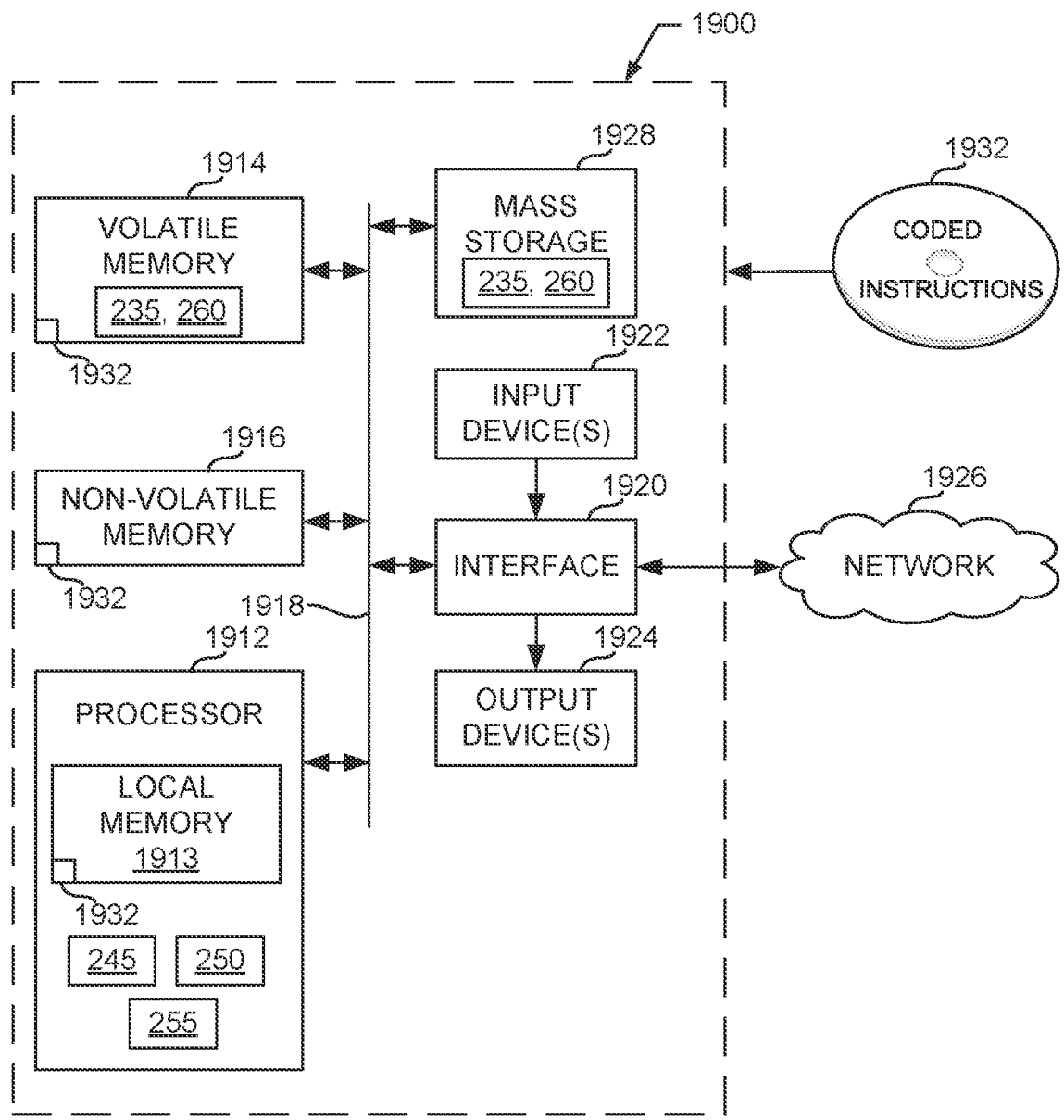
FIG. 19 is a block diagram of an example processing platform structured to execute the instructions of FIG. 5 to implement the example computing system of FIG. 2.

FIG. 19 is a block diagram of an example processing platform 1900 structured to execute the instructions of FIG. 5 to implement the example first computing system 230 of FIG. 2. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 255, the example trainer 250, and the example training controller 245.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

The machine executable instructions 420 of FIG. 5 may be stored in the mass storage device 1928, in the volatile memory 1914, in the non-volatile memory 1916, and/or on a removable non-transitory computer readable storage medium such as a CD or DVD.

Figure 20:
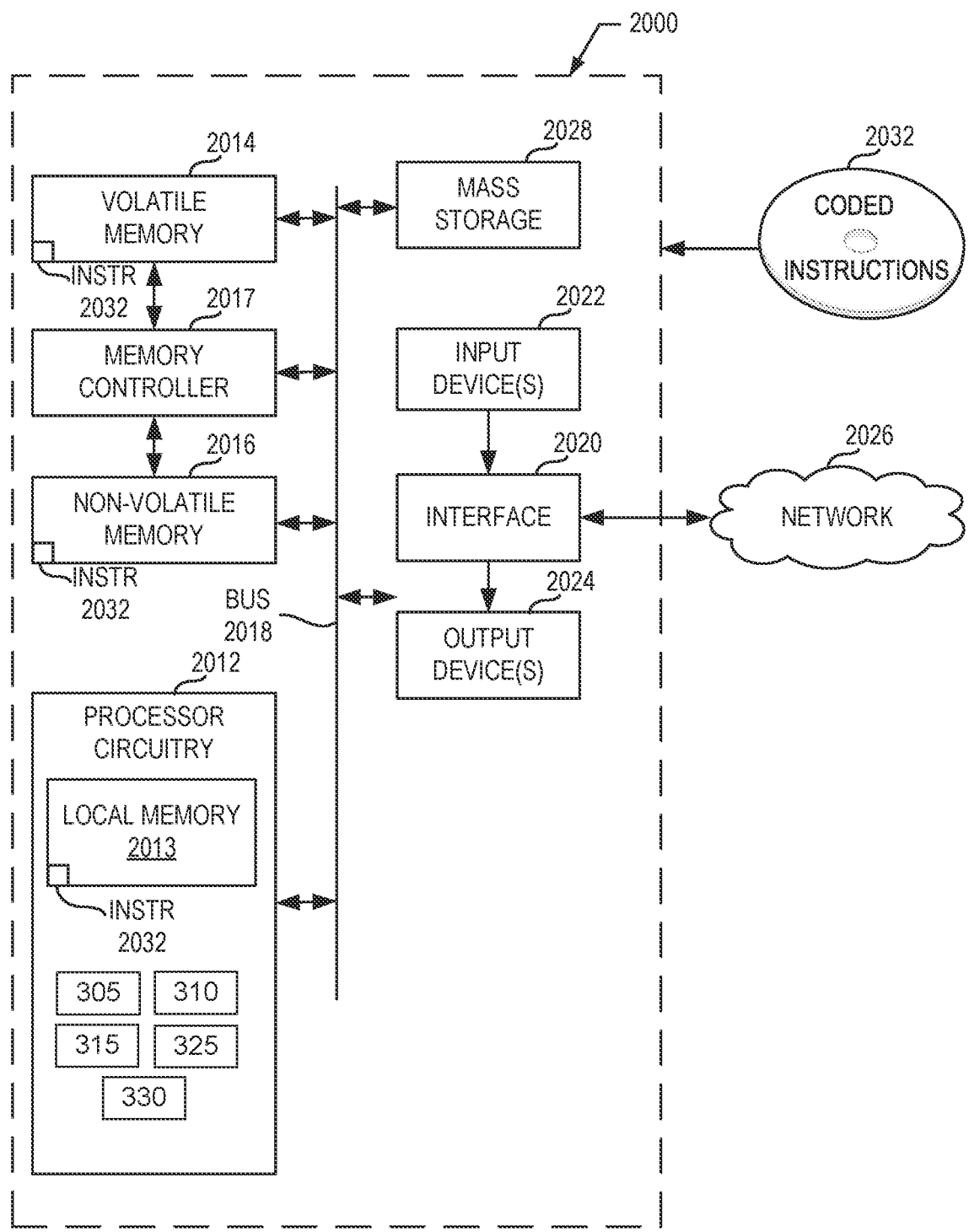
FIG. 20 is a block diagram of an example processing platform including processor circuitry structured to execute the example machine readable instructions of FIG. 6 to implement the example scale aligner circuitry of FIG. 3.

FIG. 20 is a block diagram of an example processing platform structured to execute the instructions of FIG. 6 to implement the example scale aligner circuitry 150 of FIG. 1. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example depth prediction input circuitry 305, scaffolding scale map input circuitry 310, scale map learner circuitry 315, loss function applier circuitry 325, and/or dense scale map generator circuitry 330.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAIVIBUS® Dynamic Random Access Memory (RDRAM®) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), a Bluetooth® interface, a near field communication (NFC) interface, and/or a PCI express interface.

In the illustrated example, one or more input devices 2022 are connected to the interface circuit 2020. The input device(s) 2022 permit(s) a user to enter data and/or commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2024 are also connected to the interface circuit 2080 of the illustrated example. The output devices 2024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2020 of the illustrated example, thus, typically includes a graphics driver card, a graphics driver chip and/or a graphics driver processor.

The interface circuit 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, redundant array of independent disks (RAID) systems, and digital versatile disk (DVD) drives.

The machine executable instructions 450 of FIG. 6 may be stored in the mass storage device 2028, in the volatile memory 2014, in the non-volatile memory 2016, and/or on a removable non-transitory computer readable storage medium such as a CD or DVD.

Figure 21:
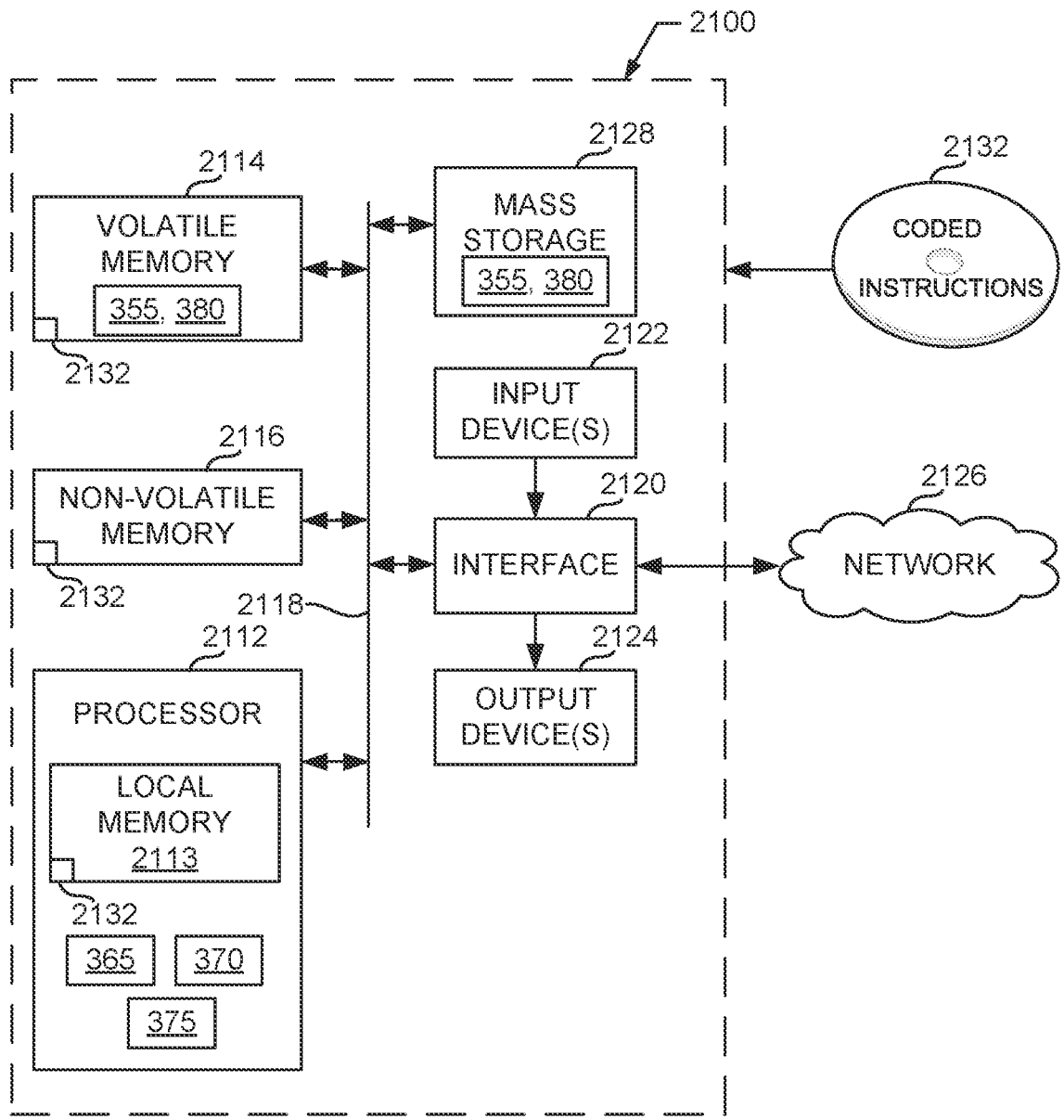
FIG. 21 is a block diagram of an example processing platform structured to execute the instructions of FIG. 7 to implement the example computing system of FIG. 3.

FIG. 21 is a block diagram of an example processing platform 2100 structured to execute the instructions of FIG. 7 to implement the example second computing system 350 of FIG. 3. The processor platform 2100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 375, the example trainer 370, and the example training controller 365.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), a Bluetooth® interface, a near field communication (NFC) interface, and/or a PCI express interface.

In the illustrated example, one or more input devices 2122 are connected to the interface circuit 2120. The input device(s) 2122 permit(s) a user to enter data and/or commands into the processor 2112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2120 of the illustrated example, thus, typically includes a graphics driver card, a graphics driver chip and/or a graphics driver processor.

The interface circuit 2120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, redundant array of independent disks (RAID) systems, and digital versatile disk (DVD) drives.

The machine executable instructions 603 of FIG. 7 may be stored in the mass storage device 2128, in the volatile memory 2114, in the non-volatile memory 2116, and/or on a removable non-transitory computer readable storage medium such as a CD or DVD.

Figure 22:
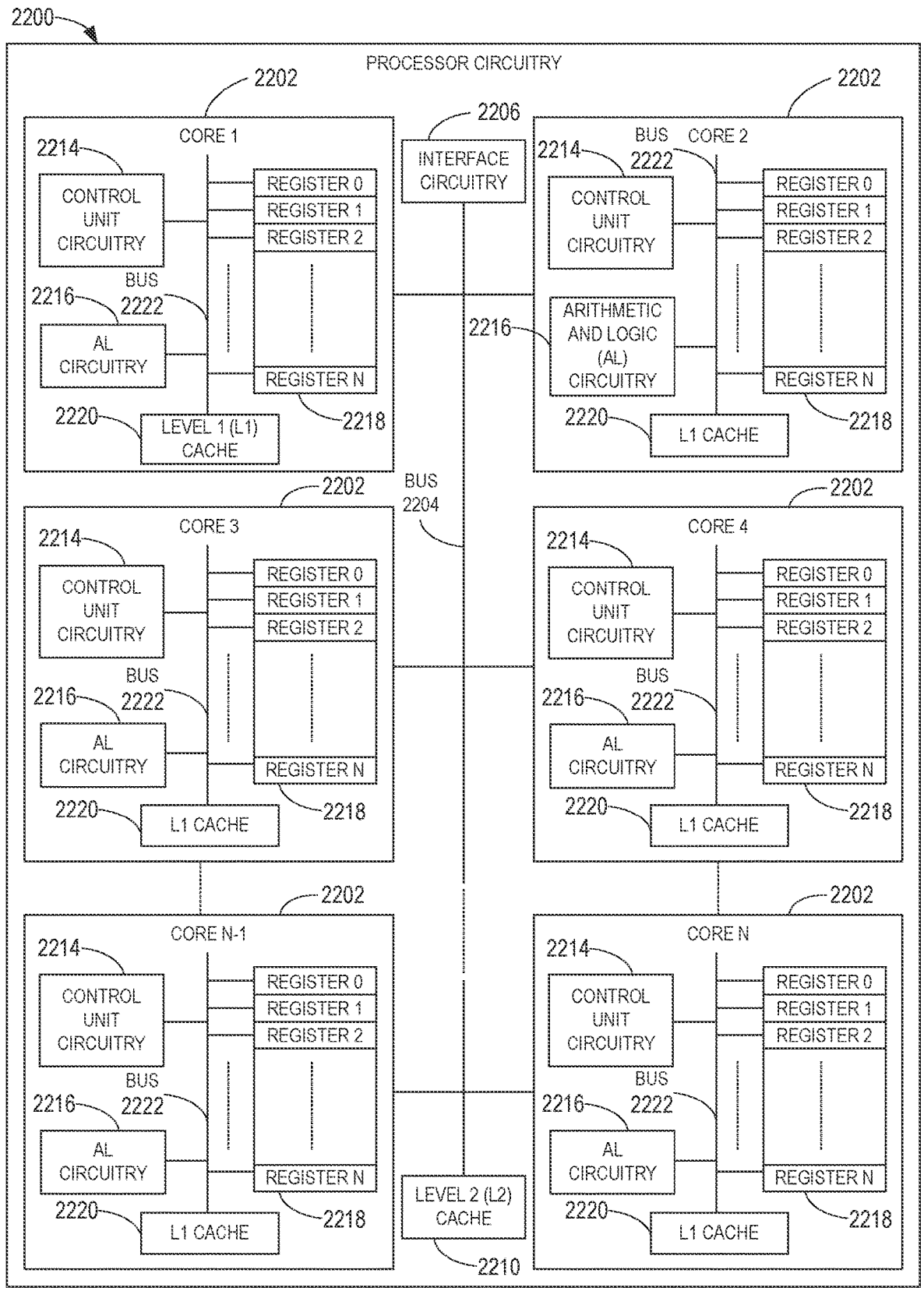
FIG. 22 is a block diagram of an example implementation of the processor circuitry of FIGS. 18, 19, and/or 20.

FIG. 22 is a block diagram of an example implementation of the processor circuitry 1812, 1912, 2012, 2112 of FIGS. 18, 19, 20, 21. In this example, the processor circuitry 1812, 1912, 2012, 2112 of FIGS. 18, 19, 10, 21 is implemented by a microprocessor 2200. For example, the microprocessor 2200 may implement multi-core hardware circuitry such as a CPU, a DSP, a GPU, an XPU, etc. Although it may include any number of example cores 2202 (e.g., 1 core), the microprocessor 2200 of this example is a multi-core semiconductor device including N cores. The cores 2202 of the microprocessor 2200 may operate independently or may cooperate to execute machine readable instructions. For example, machine code corresponding to a firmware program, an embedded software program, or a software program may be executed by one of the cores 2202 or may be executed by multiple ones of the cores 2202 at the same or different times. In some examples, the machine code corresponding to the firmware program, the embedded software program, or the software program is split into threads and executed in parallel by two or more of the cores 2202. The software program may correspond to a portion or all of the machine readable instructions and/or operations represented by the flowcharts of FIGS. 4, 5, 6, and/or 7.

The cores 2202 may communicate by an example bus 2204. In some examples, the bus 2204 may implement a communication bus to effectuate communication associated with one(s) of the cores 2202. For example, the bus 2204 may implement at least one of an Inter-Integrated Circuit (I2C) bus, a Serial Peripheral Interface (SPI) bus, a PCI bus, or a PCIe bus. Additionally or alternatively, the bus 2204 may implement any other type of computing or electrical bus. The cores 2202 may obtain data, instructions, and/or signals from one or more external devices by example interface circuitry 2206. The cores 2202 may output data, instructions, and/or signals to the one or more external devices by the interface circuitry 2206. Although the cores 2202 of this example include example local memory 2220 (e.g., Level 1 (L1) cache that may be split into an L1 data cache and an L1 instruction cache), the microprocessor 2200 also includes example shared memory 2210 that may be shared by the cores (e.g., Level 2 (L2 cache)) for high-speed access to data and/or instructions. Data and/or instructions may be transferred (e.g., shared) by writing to and/or reading from the shared memory 2210. The local memory 2220 of each of the cores 2202 and the shared memory 2210 may be part of a hierarchy of storage devices including multiple levels of cache memory and the main memory (e.g., the main memory 1814, 1816 of FIG. 18). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2202 may be referred to as a CPU, DSP, GPU, etc., or any other type of hardware circuitry. Each core 2202 includes control unit circuitry 2214, arithmetic and logic (AL) circuitry (sometimes referred to as an ALU) 2216, a plurality of registers 2218, the L1 cache 2220, and an example bus 2222. Other structures may be present. For example, each core 2202 may include vector unit circuitry, single instruction multiple data (SIMD) unit circuitry, load/store unit (LSU) circuitry, branch/jump unit circuitry, floating-point unit (FPU) circuitry, etc. The control unit circuitry 2214 includes semiconductor-based circuits structured to control (e.g., coordinate) data movement within the corresponding core 2202. The AL circuitry 2216 includes semiconductor-based circuits structured to perform one or more mathematic and/or logic operations on the data within the corresponding core 2202. The AL circuitry 2216 of some examples performs integer-based operations. In other examples, the AL circuitry 2216 also performs floating point operations. In yet other examples, the AL circuitry 2216 may include first AL circuitry that performs integer-based operations and second AL circuitry that performs floating point operations. In some examples, the AL circuitry 2216 may be referred to as an Arithmetic Logic Unit (ALU). The registers 2218 are semiconductor-based structures to store data and/or instructions such as results of one or more of the operations performed by the AL circuitry 2216 of the corresponding core 2202. For example, the registers 2218 may include vector register(s), SIMD register(s), general purpose register (s), flag register(s), segment register(s), machine specific register(s), instruction pointer register(s), control register(s), debug register(s), memory management register(s), machine check register(s), etc. The registers 2218 may be arranged in a bank as shown in FIG. 22. Alternatively, the registers 2218 may be organized in any other arrangement, format, or structure including distributed throughout the core 2202 to shorten access time. The bus 2222 may implement at least one of an I2C bus, a SPI bus, a PCI bus, or a PCIe bus.

Each core 2202 and/or, more generally, the microprocessor 2200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 23:
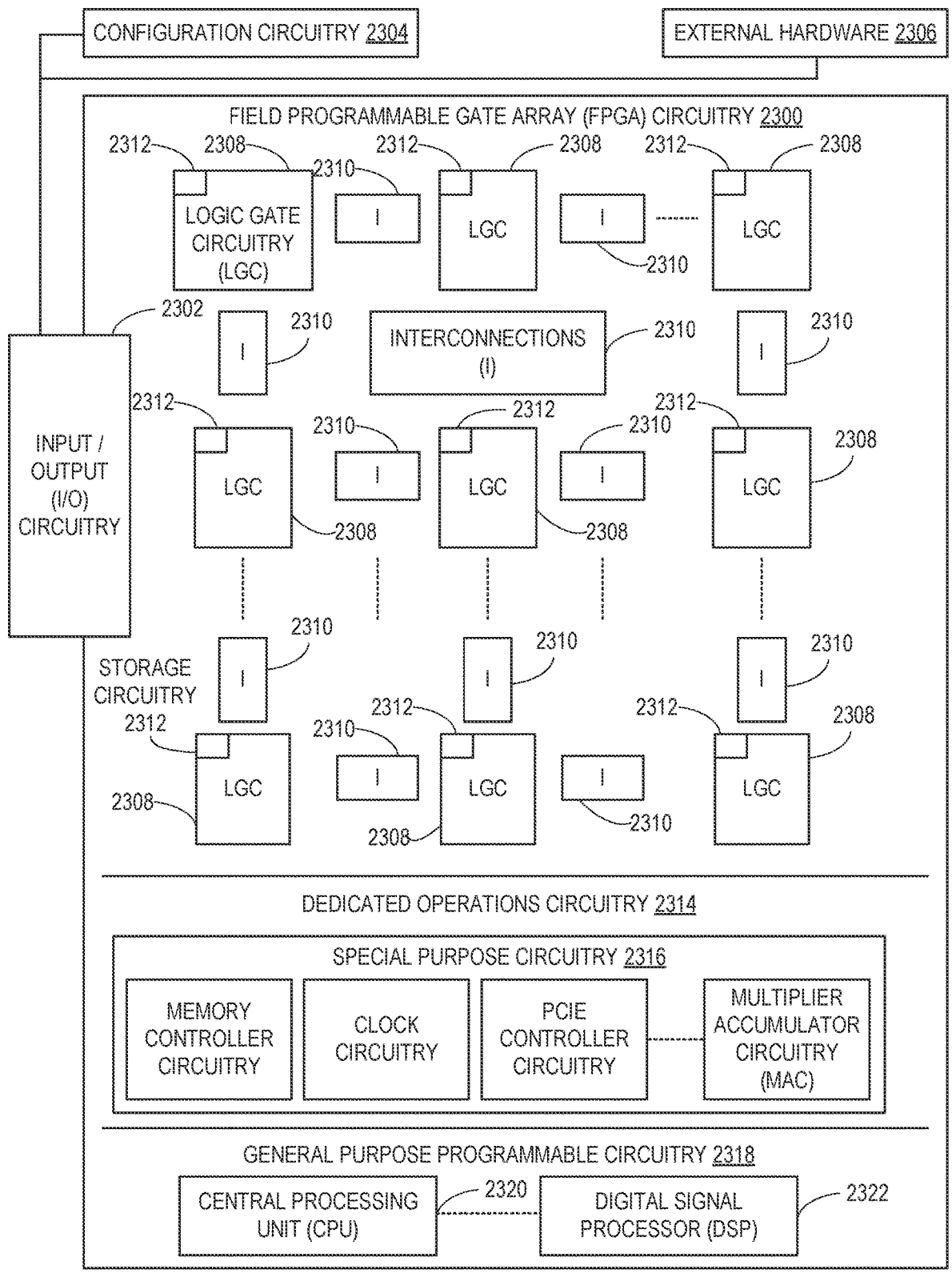
FIG. 23 is a block diagram of another example implementation of the processor circuitry of FIGS. 18, 19, and/or 20.

FIG. 23 is a block diagram of another example implementation of the processor circuitry 1812, 1912, 2012, 2112 of FIGS. 18, 19, 20, 21. In this example, the processor circuitry 1812, 1912, 2012, 2112 is implemented by FPGA circuitry 2300. The FPGA circuitry 2300 can be used, for example, to perform operations that could otherwise be performed by the example microprocessor 2200 of FIG. 22 executing corresponding machine readable instructions. However, once configured, the FPGA circuitry 2300 instantiates the machine readable instructions in hardware and, thus, can often execute the operations faster than they could be performed by a general purpose microprocessor executing the corresponding software.

More specifically, in contrast to the microprocessor 2200 of FIG. 22 described above (which is a general purpose device that may be programmed to execute some or all of the machine readable instructions represented by the flowchart of FIGS. 4, 5, 6 and/or 7 but whose interconnections and logic circuitry are fixed once fabricated), the FPGA circuitry 2300 of the example of FIG. 23 includes interconnections and logic circuitry that may be configured and/or interconnected in different ways after fabrication to instantiate, for example, some or all of the machine readable instructions represented by the flowchart of FIGS. 4, 5, 6, and/or 7. In particular, the FPGA 2300 may be thought of as an array of logic gates, interconnections, and switches. The switches can be programmed to change how the logic gates are interconnected by the interconnections, effectively forming one or more dedicated logic circuits (unless and until the FPGA circuitry 2300 is reprogrammed). The configured logic circuits enable the logic gates to cooperate in different ways to perform different operations on data received by input circuitry. Those operations may correspond to some or all of the software represented by the flowchart of FIGS. 4, 5, 6, and/or 7. As such, the FPGA circuitry 2300 may be structured to effectively instantiate some or all of the machine readable instructions of the flowchart of FIGS. 4, 5, 6, and/or 7 as dedicated logic circuits to perform the operations corresponding to those software instructions in a dedicated manner analogous to an ASIC. Therefore, the FPGA circuitry 2300 may perform the operations corresponding to the some or all of the machine readable instructions of FIGS. 4, 5, 6, and/or 7 faster than the general purpose microprocessor can execute the same.

In the example of FIG. 23, the FPGA circuitry 2300 is structured to be programmed (and/or reprogrammed one or more times) by an end user by a hardware description language (HDL) such as Verilog. The FPGA circuitry 2300 of FIG. 23, includes example input/output (I/O) circuitry 2302 to obtain and/or output data to/from example configuration circuitry 2304 and/or external hardware (e.g., external hardware circuitry) 2306. For example, the configuration circuitry 2304 may implement interface circuitry that may obtain machine readable instructions to configure the FPGA circuitry 2300, or portion(s) thereof. In some such examples, the configuration circuitry 2304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2306 may implement the microprocessor 2200 of FIG. 22. The FPGA circuitry 2300 also includes an array of example logic gate circuitry 2308, a plurality of example configurable interconnections 2310, and example storage circuitry 2312. The logic gate circuitry 2308 and interconnections 2310 are configurable to instantiate one or more operations that may correspond to at least some of the machine readable instructions of FIGS. 4, 5, 6, and/or 7 and/or other desired operations. The logic gate circuitry 2308 shown in FIG. 23 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2308 to enable configuration of the electrical structures and/or the logic gates to form circuits to perform desired operations. The logic gate circuitry 2308 may include other electrical structures such as look-up tables (LUTs), registers (e.g., flip-flops or latches), multiplexers, etc.

The interconnections 2310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2308 to program desired logic circuits.

The storage circuitry 2312 of the illustrated example is structured to store result(s) of the one or more of the operations performed by corresponding logic gates. The storage circuitry 2312 may be implemented by registers or the like. In the illustrated example, the storage circuitry 2312 is distributed amongst the logic gate circuitry 2308 to facilitate access and increase execution speed.

The example FPGA circuitry 2300 of FIG. 23 also includes example Dedicated Operations Circuitry 2314. In this example, the Dedicated Operations Circuitry 2314 includes special purpose circuitry 2316 that may be invoked to implement commonly used functions to avoid the need to program those functions in the field. Examples of such special purpose circuitry 2316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2300 may also include example general purpose programmable circuitry 2318 such as an example CPU 2320 and/or an example DSP 2322. Other general purpose programmable circuitry 2318 may additionally or alternatively be present such as a GPU, an XPU, etc., that can be programmed to perform other operations.

Although FIGS. 22 and 23 illustrate two example implementations of the processor circuitry 1812, 1912, 2012, 2112 of FIGS. 18, 19, 20, and/or 21, many other approaches are contemplated. For example, as mentioned above, modern FPGA circuitry may include an on-board CPU, such as one or more of the example CPU 2320 of FIG. 23. Therefore, the processor circuitry 1812, 1912, 2012, 2112 of FIGS. 18, 19, 20, and/or 21 may additionally be implemented by combining the example microprocessor 2200 of FIG. 22 and the example FPGA circuitry 2300 of FIG. 23. In some such hybrid examples, a first portion of the machine readable instructions represented by the flowchart of FIGS. 4, 5, 6, and/or 7 may be executed by one or more of the cores 2202 of FIG. 22 and a second portion of the machine readable instructions represented by the flowchart of FIG. 4, 5, 6, and/or 7 may be executed by the FPGA circuitry 2300 of FIG. 23.

In some examples, the processor circuitry 1812, 1912, 2012, 2112 of FIGS. 18, 19, 20, and/or 21 may be in one or more packages. For example, the processor circuitry 2200 of FIG. 22 and/or the FPGA circuitry 2300 of FIG. 23 may be in one or more packages. In some examples, an XPU may be implemented by the processor circuitry 1812, 1912, 2012, 2112 of FIGS. 18, 19, 20, and/or 21 which may be in one or more packages. For example, the XPU may include a CPU in one package, a DSP in another package, a GPU in yet another package, and an FPGA in still yet another package.

Figure 24:
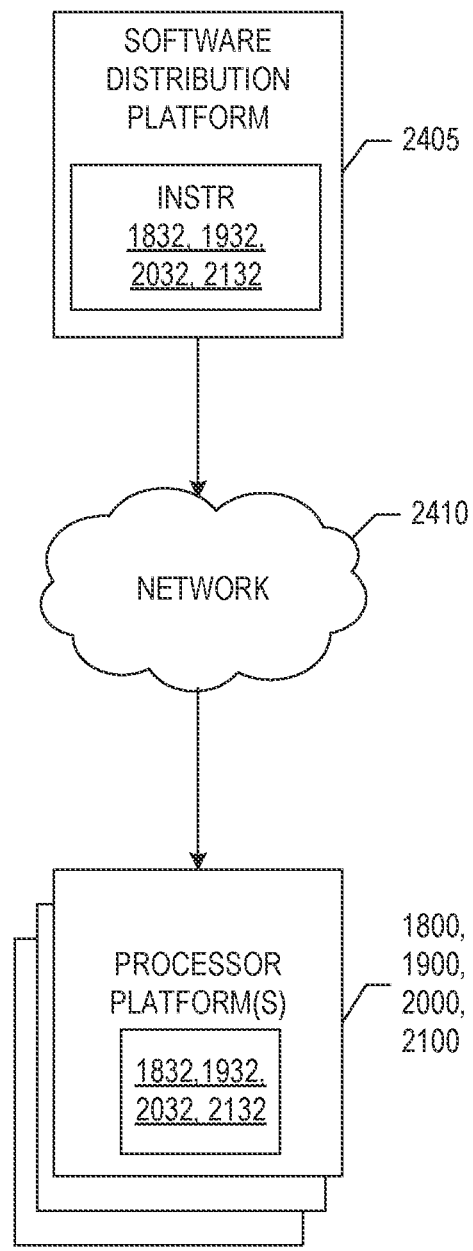
FIG. 24 is a block diagram of an example software distribution platform (e.g., one or more servers) to distribute software (e.g., software corresponding to the example machine readable instructions of FIGS. 4, 5, and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2405 to distribute software such as the example machine readable instructions 1832, 1932, 2032, 2132 of FIGS. 18, 19, 20, and/or 21 to hardware devices owned and/or operated by third parties is illustrated in FIG. 24. The example software distribution platform 2405 may be implemented by any computer server, data facility, cloud service, etc., capable of storing and transmitting software to other computing devices. The third parties may be customers of the entity owning and/or operating the software distribution platform 2405. For example, the entity that owns and/or operates the software distribution platform 2405 may be a developer, a seller, and/or a licensor of software such as the example machine readable instructions 1832, 1932, 2032, 2132 of FIGS. 18, 19, 20, and/or 21. The third parties may be consumers, users, retailers, OEMs, etc., who purchase and/or license the software for use and/or re-sale and/or sub-licensing. In the illustrated example, the software distribution platform 2405 includes one or more servers and one or more storage devices. The storage devices store the machine readable instructions 1832, 1932, 2032, 2132, which may correspond to the example machine readable instructions 400, 420, 450, 603 of FIGS. 4, 5, 6, and/or 7, as described above. The one or more servers of the example software distribution platform 2405 are in communication with a network 2410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1832, 1932, 2032, 2132 from the software distribution platform 2405. For example, the software, which may correspond to the example machine readable instructions 400, 420, 450, 603 of FIGS. 4, 5, 6, and/or 7, may be downloaded to the example processor platform 1800, 1900, 2000, 2100 which is to execute the machine readable instructions 1832, 1932, 2032, 2132 to implement the global alignment generator circuitry 120 and/or the scale aligner circuitry 150. In some example, one or more servers of the software distribution platform 2405 periodically offer, transmit, and/or force updates to the software (e.g., the example machine readable instructions 1832, 1932, 2032, 2132 of FIGS. 18, 19, 20, and/or 21) to ensure improvements, patches, updates, etc., are distributed and applied to the software at the end user devices.

From the foregoing, it will be appreciated that example systems, methods, apparatus, and articles of manufacture have been disclosed that permit metric depth estimation using a monocular visual-inertial system. Achieving both metric accuracy and high generalizability is a key challenge in learning-based depth estimation. Methods and apparatus disclosed herein incorporate inertial data into the visual depth estimation pipeline using dense-to-dense depth alignment with estimated and learned scale factors. Inertial measurements inform and propagate metric scale throughout global and local alignment stages. Methods and apparatus disclosed herein support direct integration of existing and future monocular depth estimation and visual-inertial odometry systems. For example, methods and apparatus disclosed herein leverage robust monocular depth estimation models trained on mixed datasets and recover metric scale for individual depth estimates. In examples disclosed herein, inertial data can be used in conjunction with monocular visual data to produce fully-dense metrically accurate depth predictions. For example, methods and apparatus disclosed herein perform least-squares fitting of monocular depth estimates against metric sparse depth, followed by learned local per-pixel depth scaling. This combination of global and dense (local) depth alignment rectifies metric scale in depth estimates, with dense alignment consistently outperforming a global alignment baseline. For example, methods and apparatus disclosed herein support simple swapping of monocular depth estimation and visual-inertial odometry subsystems to allow recent and future advances in monocular depth estimation and/or visual-inertial odometry to be directly leveraged for improved dense metric depth estimation. Furthermore, examples disclosed herein resolve metric scale for metrically ambiguous depth estimates, thereby making highly generalizable affine-invariant depth models more practical for integration into applications such as real-world sensor fusion, augmented reality and/or virtual reality (AR/VR), mapping, navigation systems, etc.

Example methods and apparatus for metric depth estimation using a monocular visual-inertial system are disclosed herein. Further examples and combinations thereof include the following:

Example 1 includes an apparatus for metric depth estimation, comprising at least one memory, instructions, and processor circuitry to execute the instructions to access a globally-aligned depth prediction, the globally-aligned depth prediction generated based on a monocular depth estimator, access a dense scale map scaffolding, the dense scale map scaffolding generated based on visual-inertial odometry, regress a dense scale residual map determined using the globally-aligned depth prediction and the dense scale map scaffolding, and apply the dense scale residual map to the globally-aligned depth prediction.

Example 2 includes the apparatus of example 1, wherein the visual-inertial odometry determines the dense scale map scaffolding based on inertial measurement unit (IMU) data and visual data.

Example 3 includes the apparatus of example 2, wherein the visual-inertial odometry generates a sequence of sparse maps based on the IMU data and the visual data, the sequence of sparse maps including metric depth values, the dense scale map scaffolding based on the metric depth values.

Example 4 includes the apparatus of example 3, wherein the globally-aligned depth prediction is based on an alignment of monocular depth estimates to the metric depth values.

Example 5 includes the apparatus of example 1, wherein the globally-aligned depth prediction is determined based on a least-squares estimation for global scale and global shift.

Example 6 includes the apparatus of example 1, wherein the processor circuitry is to train a scale map learner (SML) neural network to resolve the scale ambiguity in monocular depth estimates.

Example 7 includes the apparatus of example 6, wherein the SML, neural network is to fill a region outside a convex hull via linear interpolation of anchor values and fill a region outside the convex hull with an identify scale value of one.

Example 8 includes a method for metric depth estimation, the method comprising accessing a globally-aligned depth prediction, the globally-aligned depth prediction generated based on a monocular depth estimator, accessing a dense scale map scaffolding, the dense scale map scaffolding generated based on visual-inertial odometry, regressing, by executing an instruction with at least one processor, a dense scale residual map determined using the globally-aligned depth prediction and the dense scale map scaffolding, and applying, by executing an instruction with at least one processor, the dense scale residual map to the globally-aligned depth prediction.

Example 9 includes the method of example 8, wherein the visual-inertial odometry determines the dense scale map scaffolding based on inertial measurement unit (IMU) data and visual data.

Example 10 includes the method of example 9, wherein the visual-inertial odometry generates a sequence of sparse maps based on the IMU data and the visual data, the sequence of sparse example 9 includes maps including metric depth values, the dense scale map scaffolding based on the metric depth values.

Example 11 includes the method of example 10, wherein the globally-aligned depth prediction is based on an alignment of monocular depth estimates to the metric depth values.

Example 12 includes the method of example 8, wherein the globally-aligned depth prediction is determined based on a least-squares estimation for global scale and global shift.

Example 13 includes the method of example 8, further including training a scale map learner (SML) neural network to resolve the scale ambiguity in monocular depth estimates.

Example 14 includes the method of example 13, wherein the SML neural network is to fill a region outside a convex hull via linear interpolation of anchor values and fill a region outside the convex hull with an identify scale value of one.

Example 15 includes a non-transitory computer readable storage medium comprising instructions that, when executed, cause a processor to at least access a globally-aligned depth prediction, the globally-aligned depth prediction generated based on a monocular depth estimator, access a dense scale map scaffolding, the dense scale map scaffolding generated based on visual-inertial odometry, regresses a dense scale residual map determined using the globally-aligned depth prediction and the dense scale map scaffolding, and apply the dense scale residual map to the globally-aligned depth prediction.

Example 16 includes the non-transitory computer readable storage medium of example 15, wherein the visual-inertial odometry determines the dense scale map scaffolding based on inertial example 15 includes measurement unit (IMU) data and visual data.

Example 17 includes the non-transitory computer readable storage medium of example 16, wherein the visual-inertial odometry generates a sequence of sparse maps based on the IMU data and the visual data, the sequence of sparse maps including metric depth values, the dense scale map scaffolding based on the metric depth values.

Example 18 includes the non-transitory computer readable storage medium of example 17, wherein globally-aligned depth prediction is based on an alignment of monocular depth estimates to the metric depth values.

Example 19 includes the non-transitory computer readable storage medium of example 15, wherein the instructions, when executed, cause a processor to train a scale map learner (SML) neural network to resolve the scale ambiguity in monocular depth estimates.

Example 20 includes the non-transitory computer readable storage medium of example 19, wherein the SML neural network is to fill a region outside a convex hull via linear interpolation of anchor values and fill a region outside the convex hull with an identify scale value of one.

Example 21 includes an apparatus for metric depth estimation, comprising means for accessing a globally-aligned depth prediction, the globally-aligned depth prediction generated based on means for estimating using monocular depth estimation, means for accessing a dense scale map scaffolding, the dense scale map scaffolding generated based on means for estimating using visual-inertial odometry, means for regressing a dense scale residual map determined using the globally-aligned depth prediction and the dense scale map scaffolding, and means for applying the dense scale residual map to the globally-aligned depth prediction.

Example 22 includes the apparatus of example 21, wherein the means for estimating using visual-inertial odometry includes determining the dense scale map scaffolding based on inertial measurement unit (IMU) data and visual data.

Example 23 includes the apparatus of example 22, wherein the means for estimating using visual-inertial odometry includes generating a sequence of sparse maps based on the IMU data and the visual data, the sequence of sparse maps including metric depth values, the dense scale map scaffolding based on the metric depth values.

Example 24 includes the apparatus of example 23, wherein the globally-aligned depth prediction is based on an alignment of monocular depth estimates to the metric depth values.

Example 25 includes the apparatus of example 21, wherein the globally-aligned depth prediction is determined based on a least-squares estimation for global scale and global shift.

Example 26 includes the apparatus of example 21, further including means for training to train a scale map learner (SML) neural network to resolve the scale ambiguity in monocular depth estimates.

Example 27 includes the apparatus of example 26, wherein the SML neural network is to fill a region outside a convex hull via linear interpolation of anchor values and fill a region outside the convex hull with an identify scale value of one.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for metric depth estimation, the apparatus comprising:
    at least one memory;
    instructions; and
    processor circuitry to execute the instructions to:
    access a globally-aligned depth prediction, the globally-aligned depth prediction generated based on a monocular depth estimator;
    access a dense scale map scaffolding, the dense scale map scaffolding generated based on visual-inertial odometry;
    regress a dense scale residual map determined using the globally-aligned depth prediction and the dense scale map scaffolding; and
    apply the dense scale residual map to the globally-aligned depth prediction.

2. The apparatus of claim 1, wherein the visual-inertial odometry determines the dense scale map scaffolding based on inertial measurement unit (IMU) data and visual data.

3. The apparatus of claim 2, wherein the visual-inertial odometry generates a sequence of sparse maps based on the IMU data and the visual data, the sequence of sparse maps including metric depth values, the dense scale map scaffolding based on the metric depth values.

4. The apparatus of claim 3, wherein the globally-aligned depth prediction is based on an alignment of monocular depth estimates to the metric depth values.

5. The apparatus of claim 1, wherein the globally-aligned depth prediction is based on a least-squares estimation for global scale and global shift.

6. The apparatus of claim 1, wherein the processor circuitry is to train a scale map learner (SML) neural network to resolve the scale ambiguity in monocular depth estimates.

7. The apparatus of claim 6, wherein the SML neural network is to fill a region within a convex hull via linear interpolation of anchor values and fill a region outside the convex hull with an identify scale value of one.

8. A method for metric depth estimation, the method comprising:
    accessing a globally-aligned depth prediction, the globally-aligned depth prediction generated based on a monocular depth estimator;
    accessing a dense scale map scaffolding, the dense scale map scaffolding generated based on visual-inertial odometry;
    regressing, by executing an instruction with at least one processor circuit, a dense scale residual map determined using the globally-aligned depth prediction and the dense scale map scaffolding; and
    applying, by executing an instruction with one or more of the at least one processor circuit, the dense scale residual map to the globally-aligned depth prediction.

9. The method of claim 8, wherein the visual-inertial odometry determines the dense scale map scaffolding based on inertial measurement unit (IMU) data and visual data.

10. The method of claim 9, wherein the visual-inertial odometry generates a sequence of sparse maps based on the IMU data and the visual data, the sequence of sparse maps including metric depth values, the dense scale map scaffolding based on the metric depth values.

11. The method of claim 10, wherein the globally-aligned depth prediction is based on an alignment of monocular depth estimates to the metric depth values.

12. The method of claim 8, wherein the globally-aligned depth prediction is determined based on a least-squares estimation for global scale and global shift.

13. The method of claim 8, further including training a scale map learner (SML) neural network to resolve the scale ambiguity in monocular depth estimates.

14. The method of claim 13, wherein the SML neural network is to fill a region within a convex hull via linear interpolation of anchor values and fill a region outside the convex hull with an identify scale value of one.

15. A non-transitory computer readable storage medium comprising instructions that, when executed, cause at least one processor circuit to at least:
    access a globally-aligned depth prediction, the globally-aligned depth prediction generated based on a monocular depth estimator;
    access a dense scale map scaffolding, the dense scale map scaffolding generated based on visual-inertial odometry;
    regresses a dense scale residual map determined using the globally-aligned depth prediction and the dense scale map scaffolding; and
    apply the dense scale residual map to the globally-aligned depth prediction.

16. The non-transitory computer readable storage medium of claim 15, wherein the visual-inertial odometry determines the dense scale map scaffolding based on inertial measurement unit (IMU) data and visual data.

17. The non-transitory computer readable storage medium of claim 16, wherein the visual-inertial odometry generates a sequence of sparse maps based on the IMU data and the visual data, the sequence of sparse maps including metric depth values, the dense scale map scaffolding based on the metric depth values.

18. The non-transitory computer readable storage medium of claim 17, wherein globally-aligned depth prediction is based on an alignment of monocular depth estimates to the metric depth values.

19. The non-transitory computer readable storage medium of claim 15, wherein the instructions, when executed, cause one or more of the at least one processor circuit to train a scale map learner (SML) neural network to resolve the scale ambiguity in monocular depth estimates.

20. The non-transitory computer readable storage medium of claim 19, wherein the SML neural network is to fill a region within a convex hull via linear interpolation of anchor values and fill a region outside the convex hull with an identify scale value of one.

21. An apparatus for metric depth estimation, the apparatus comprising:

means for accessing a globally-aligned depth prediction, the globally-aligned depth prediction generated based on means for estimating using monocular depth estimation;

means for accessing a dense scale map scaffolding, the dense scale map scaffolding generated based on means for estimating using visual-inertial odometry;

means for regressing a dense scale residual map determined using the globally-aligned depth prediction and the dense scale map scaffolding; and means for applying the dense scale residual map to the globally-aligned depth prediction.

22. The apparatus of claim 21, wherein the means for estimating using visual-inertial odometry is to determine the dense scale map scaffolding based on inertial measurement unit (IMU) data and visual data.

23. The apparatus of claim 22, wherein the means for estimating using visual-inertial odometry is to generate a sequence of sparse maps based on the IMU data and the visual data, the sequence of sparse maps including metric depth values, the dense scale map scaffolding based on the metric depth values.

24. The apparatus of claim 23, wherein the globally-aligned depth prediction is based on an alignment of monocular depth estimates to the metric depth values.

25. The apparatus of claim 21, wherein the globally-aligned depth prediction is based on a least-squares estimation for global scale and global shift.

\* \* \* \* \*